US010641967B1

(12) United States Patent
Cote et al.

(10) Patent No.: US 10,641,967 B1
(45) Date of Patent: May 5, 2020

(54) MULTIPORT ASSEMBLIES INCLUDING A MODULAR ADAPTER SUPPORT ARRAY

(71) Applicant: CORNING RESEARCH & DEVELOPMENT CORPORATION, Corning, NY (US)

(72) Inventors: Monique Lise Cote, Fort Worth, TX (US); Joel Christopher Rosson, Hickory, NC (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/193,278

(22) Filed: Nov. 16, 2018

(51) Int. Cl.
*G02B 6/38* (2006.01)

(52) U.S. Cl.
CPC ........... *G02B 6/3825* (2013.01); *G02B 6/387* (2013.01); *G02B 6/3893* (2013.01); *G02B 6/3897* (2013.01)

(58) Field of Classification Search
None
See application file for complete search history.

(56) References Cited

U.S. PATENT DOCUMENTS

| | | | |
|---|---|---|---|
| 3,792,284 A | 2/1974 | Kaelin | |
| 4,413,880 A | 11/1983 | Forrest et al. | |
| 4,688,200 A | 8/1987 | Poorman et al. | |
| 5,007,860 A | 4/1991 | Robinson et al. | |
| 5,067,783 A | 11/1991 | Lampert | |
| 5,073,042 A | 12/1991 | Mulholland et al. | |
| 5,212,752 A | 5/1993 | Stephenson et al. | |
| 5,381,494 A | 1/1995 | O'Donnell et al. | |
| 5,408,570 A | 4/1995 | Cook et al. | |
| 5,553,186 A | 9/1996 | Allen | |
| 5,600,747 A | 2/1997 | Yamakawa et al. | |
| 5,631,993 A | 5/1997 | Cloud et al. | |
| 5,647,045 A | 7/1997 | Robinson et al. | |
| 5,748,821 A | 5/1998 | Schempp et al. | |

(Continued)

FOREIGN PATENT DOCUMENTS

| CN | 1213783 A | 4/1999 |
|---|---|---|
| CN | 1646962 A | 7/2005 |

(Continued)

OTHER PUBLICATIONS

Coaxum, L., et al., U.S. Appl. No. 62/341,947, "Fiber Optic Multiport Having Different Types of Ports for Multi-Use," filed May 26, 2016.

(Continued)

*Primary Examiner* — Omar R Rojas
(74) *Attorney, Agent, or Firm* — Michael E. Carroll, Jr.

(57) ABSTRACT

A multiport assembly includes a shell defining a cavity positioned within the shell, a plurality of optical adapter assemblies, a modular adapter support array engaged with the plurality of optical adapter assemblies and positioned within the cavity, the modular adapter support array defining a plurality of adapter passageways extending through the modular adapter support array in a longitudinal direction, where each adapter passageway of the plurality of adapter passageways extends around at least a portion of a corresponding optical adapter assembly of the plurality of optical adapter assemblies, and a plurality of optical connector defining respective connector insertion paths extending inward from the plurality of optical connector ports to the cavity.

29 Claims, 20 Drawing Sheets

(56) References Cited

U.S. PATENT DOCUMENTS

| | | |
|---|---|---|
| 5,781,686 A | 7/1998 | Robinson et al. |
| 5,791,918 A | 8/1998 | Pierce |
| 5,862,290 A | 1/1999 | Burek et al. |
| 5,960,141 A | 9/1999 | Sasaki et al. |
| 6,108,482 A | 8/2000 | Roth |
| 6,112,006 A | 8/2000 | Foss |
| 6,206,581 B1 | 3/2001 | Driscoll et al. |
| 6,375,363 B1 | 4/2002 | Harrison et al. |
| 6,466,725 B2 | 10/2002 | Battey et al. |
| 6,738,555 B1 | 5/2004 | Cooke et al. |
| 6,771,861 B2 | 8/2004 | Wagner et al. |
| 7,120,347 B2 | 10/2006 | Blackwell, Jr. et al. |
| 7,277,614 B2 | 10/2007 | Cody et al. |
| 7,302,152 B2 | 11/2007 | Luther et al. |
| 7,330,629 B2 | 2/2008 | Cooke et al. |
| 7,333,708 B2 | 2/2008 | Blackwell, Jr. et al. |
| 7,444,056 B2 | 10/2008 | Allen et al. |
| 7,489,849 B2 | 2/2009 | Reagan et al. |
| 7,565,055 B2 | 7/2009 | Lu et al. |
| 7,621,675 B1 | 11/2009 | Bradley |
| 7,627,222 B2 | 12/2009 | Reagan et al. |
| 7,653,282 B2 | 1/2010 | Blackwell, Jr. et al. |
| 7,680,388 B2 | 3/2010 | Reagan et al. |
| 7,709,733 B1 | 5/2010 | Plankell |
| 7,740,409 B2 | 6/2010 | Bolton et al. |
| 7,753,596 B2 | 7/2010 | Cox |
| 7,806,599 B2 | 10/2010 | Margolin et al. |
| 7,844,160 B2 | 11/2010 | Reagan et al. |
| 7,903,923 B2 | 3/2011 | Gronvall et al. |
| 8,025,445 B2 | 9/2011 | Rambow et al. |
| 8,213,761 B2 | 7/2012 | Gronvall et al. |
| 8,218,935 B2 | 7/2012 | Reagan et al. |
| 8,267,596 B2 | 9/2012 | Theuerkorn |
| RE43,762 E | 10/2012 | Smith et al. |
| 8,301,004 B2 | 10/2012 | Cooke et al. |
| 8,466,262 B2 | 6/2013 | Siadak et al. |
| 8,520,996 B2 | 8/2013 | Cowen et al. |
| 8,737,837 B2 | 5/2014 | Conner et al. |
| 8,755,663 B2 | 6/2014 | Makrides-Sarvanos et al. |
| 8,770,861 B2 | 7/2014 | Smith et al. |
| 9,684,138 B2 | 6/2017 | Lu |
| 10,114,176 B2 | 10/2018 | Gimblet et al. |
| 2002/0064364 A1 | 5/2002 | Battey et al. |
| 2003/0063866 A1 | 4/2003 | Melton et al. |
| 2004/0072454 A1 | 4/2004 | Nakajima et al. |
| 2004/0157499 A1 | 8/2004 | Nania et al. |
| 2005/0129379 A1 | 6/2005 | Reagan et al. |
| 2005/0175307 A1 | 8/2005 | Battey et al. |
| 2005/0232552 A1 | 10/2005 | Takahashi et al. |
| 2005/0281510 A1 | 12/2005 | Vo et al. |
| 2005/0281514 A1 | 12/2005 | Oki et al. |
| 2006/0045430 A1 | 3/2006 | Theuerkorn et al. |
| 2006/0093278 A1 | 5/2006 | Elkins, II et al. |
| 2006/0120672 A1 | 6/2006 | Cody et al. |
| 2006/0133758 A1 | 6/2006 | Mullaney et al. |
| 2006/0133759 A1 | 6/2006 | Mullaney et al. |
| 2006/0147172 A1 | 7/2006 | Luther et al. |
| 2006/0153503 A1 | 7/2006 | Suzuki et al. |
| 2006/0153517 A1 | 7/2006 | Reagan et al. |
| 2006/0171638 A1 | 7/2006 | Reagan et al. |
| 2006/0269204 A1 | 11/2006 | Barth et al. |
| 2006/0269208 A1 | 11/2006 | Allen et al. |
| 2006/0280420 A1 | 12/2006 | Blackwell, Jr. et al. |
| 2007/0031100 A1 | 2/2007 | Garcia et al. |
| 2008/0080817 A1 | 4/2008 | Melton et al. |
| 2008/0138016 A1 | 6/2008 | Katagiyama et al. |
| 2008/0175542 A1 | 7/2008 | Lu et al. |
| 2008/0175544 A1 | 7/2008 | Fujiwara et al. |
| 2008/0175548 A1 | 7/2008 | Knecht et al. |
| 2008/0264664 A1 | 10/2008 | Dinh et al. |
| 2008/0273837 A1 | 11/2008 | Margolin et al. |
| 2009/0060421 A1 | 3/2009 | Parikh et al. |
| 2009/0148101 A1 | 6/2009 | Lu et al. |
| 2009/0148104 A1 | 6/2009 | Lu et al. |
| 2009/0185835 A1 | 7/2009 | Park et al. |
| 2009/0245743 A1 | 10/2009 | Cote et al. |
| 2009/0263097 A1 | 10/2009 | Solheid et al. |
| 2010/0008909 A1 | 1/2010 | Siadak et al. |
| 2010/0014813 A1 | 1/2010 | Ito et al. |
| 2010/0015834 A1 | 1/2010 | Siebens |
| 2010/0092136 A1 | 4/2010 | Nhep |
| 2010/0172616 A1 | 7/2010 | Lu et al. |
| 2010/0197222 A1 | 8/2010 | Scheucher |
| 2010/0247053 A1 | 9/2010 | Cowen et al. |
| 2010/0272399 A1 | 10/2010 | Griffiths et al. |
| 2010/0303426 A1 | 12/2010 | Davis |
| 2010/0310213 A1 | 12/2010 | Lewallen et al. |
| 2011/0019964 A1 | 1/2011 | Nhep et al. |
| 2011/0047731 A1 | 3/2011 | Sugita et al. |
| 2011/0108719 A1 | 5/2011 | Ford et al. |
| 2011/0129186 A1* | 6/2011 | Lewallen .............. G02B 6/3825 385/59 |
| 2011/0164854 A1 | 7/2011 | Desard et al. |
| 2011/0262099 A1 | 10/2011 | Castonguay et al. |
| 2011/0299814 A1 | 12/2011 | Nakagawa |
| 2012/0008909 A1 | 1/2012 | Mertesdorf et al. |
| 2012/0106912 A1 | 5/2012 | McGranahan et al. |
| 2012/0251063 A1 | 10/2012 | Reagan et al. |
| 2012/0252244 A1 | 10/2012 | Elkins, II et al. |
| 2013/0034333 A1 | 2/2013 | Holmberg et al. |
| 2013/0109213 A1 | 5/2013 | Chang |
| 2014/0016902 A1 | 1/2014 | Pepe et al. |
| 2014/0079356 A1 | 3/2014 | Pepin et al. |
| 2014/0133806 A1 | 5/2014 | Hill et al. |
| 2014/0133807 A1 | 5/2014 | Katoh |
| 2014/0161397 A1 | 6/2014 | Gallegos et al. |
| 2014/0205257 A1 | 7/2014 | Durrant et al. |
| 2014/0219622 A1 | 8/2014 | Coan et al. |
| 2014/0233896 A1 | 8/2014 | Ishigami et al. |
| 2014/0241671 A1 | 8/2014 | Koreeda et al. |
| 2014/0294395 A1 | 10/2014 | Waldron et al. |
| 2014/0328559 A1 | 11/2014 | Kobayashi et al. |
| 2014/0355936 A1 | 12/2014 | Bund et al. |
| 2015/0003788 A1 | 1/2015 | Chen et al. |
| 2015/0036982 A1 | 2/2015 | Nhep et al. |
| 2015/0185423 A1 | 7/2015 | Matsui et al. |
| 2015/0253528 A1 | 9/2015 | Corbille et al. |
| 2015/0268434 A1 | 9/2015 | Barnette, Jr. et al. |
| 2015/0316727 A1 | 11/2015 | Kondo et al. |
| 2015/0346436 A1 | 12/2015 | Pepe et al. |
| 2016/0131851 A1 | 5/2016 | Theuerkorn |
| 2016/0131857 A1 | 5/2016 | Pimentel et al. |
| 2016/0139346 A1 | 5/2016 | Bund et al. |
| 2016/0161688 A1 | 6/2016 | Nishimura |
| 2016/0161689 A1 | 6/2016 | Nishimura |
| 2016/0209599 A1 | 7/2016 | Van Baelen et al. |
| 2016/0238810 A1 | 8/2016 | Hubbard et al. |
| 2016/0246019 A1 | 8/2016 | Ishii et al. |
| 2016/0259133 A1 | 9/2016 | Kobayashi et al. |
| 2016/0306122 A1 | 10/2016 | Tong et al. |
| 2017/0131509 A1 | 5/2017 | Xiao et al. |
| 2017/0176690 A1 | 6/2017 | Bretz et al. |
| 2017/0219782 A1 | 8/2017 | Nishimura |
| 2017/0261699 A1 | 9/2017 | Compton et al. |

FOREIGN PATENT DOCUMENTS

| | | |
|---|---|---|
| CN | 101195453 A | 6/2008 |
| CN | 201704194 U | 1/2011 |
| CN | 104064903 A | 9/2014 |
| EP | 0957381 A1 | 11/1999 |
| EP | 1391762 A1 | 2/2004 |
| EP | 3101740 A1 | 12/2016 |
| JP | 63089421 A | 4/1988 |
| JP | 63078908 U | 5/1988 |
| JP | 07318758 A | 12/1995 |
| JP | 08292331 A | 11/1996 |
| JP | 11064682 A | 5/1999 |
| JP | 11326693 A | 11/1999 |
| JP | 2001290051 A | 10/2001 |
| JP | 2003121699 A | 4/2003 |
| JP | 2003177279 A | 6/2003 |
| JP | 2005031544 A | 2/2005 |
| JP | 2005077591 A | 3/2005 |

(56) References Cited

FOREIGN PATENT DOCUMENTS

| | | | |
|---|---|---|---|
| JP | 2006023502 | A | 1/2006 |
| JP | 2006337637 | A | 12/2006 |
| JP | 2007078740 | A | 3/2007 |
| JP | 2007121859 | A | 5/2007 |
| JP | 2009265208 | A | 11/2009 |
| JP | 2010152084 | A | 7/2010 |
| JP | 2011033698 | A | 2/2011 |
| JP | 2013156580 | A | 8/2013 |
| JP | 2014085474 | A | 5/2014 |
| JP | 05537852 | B2 | 7/2014 |
| JP | 05538328 | B2 | 7/2014 |
| JP | 2014134746 | A | 7/2014 |
| JP | 03207223 | U | 11/2016 |
| KR | 1020130081087 | A | 7/2013 |
| WO | 2006113726 | A1 | 10/2006 |
| WO | 2012037727 | A1 | 3/2012 |
| WO | 2014151259 | A1 | 9/2014 |
| WO | 2014167447 | A1 | 10/2014 |
| WO | 2014197894 | A1 | 12/2014 |
| WO | 2015144883 | A1 | 10/2015 |
| WO | 2016095213 | A1 | 6/2016 |
| WO | 2016156610 | A1 | 10/2016 |
| WO | 2016168389 | A1 | 10/2016 |
| WO | 2019005190 | A2 | 1/2019 |
| WO | 2019005191 | A1 | 1/2019 |
| WO | 2019005192 | A1 | 1/2019 |
| WO | 2019005193 | A1 | 1/2019 |
| WO | 2019005194 | A1 | 1/2019 |
| WO | 2019005195 | A1 | 1/2019 |
| WO | 2019005196 | A1 | 1/2019 |
| WO | 2019005197 | A1 | 1/2019 |
| WO | 2019005198 | A1 | 1/2019 |
| WO | 2019005199 | A1 | 1/2019 |
| WO | 2019005200 | A1 | 1/2019 |
| WO | 2019005201 | A1 | 1/2019 |
| WO | 2019005202 | A1 | 1/2019 |
| WO | 2019005203 | A1 | 1/2019 |
| WO | 2019005204 | A1 | 1/2019 |

OTHER PUBLICATIONS

International Search Report and Written Opinion PCT/US2017/063938 dated May 14, 2018.
International Search Report and Written Opinion PCT/US2017/063953 dated May 14, 2018.
International Search Report and Written Opinion PCT/US2017/063991 dated May 14, 2018.
International Search Report and Written Opinion PCT/US2017/064027 dated Oct. 9, 2018.
International Search Report and Written Opinion PCT/US2017/064063 dated May 15, 2018.
International Search Report and Written Opinion PCT/US2017/064071 dated May 14, 2018.
International Search Report and Written Opinion PCT/US2017/064072 dated May 14, 2018.
International Search Report and Written Opinion PCT/US2017/064077 dated Feb. 26, 2018.
International Search Report and Written Opinion PCT/US2017/064084 dated Feb. 26, 2018.
International Search Report and Written Opinion PCT/US2017/064087 dated Feb. 26, 2018.
International Search Report and Written Opinion PCT/US2017/064092 dated Feb. 23, 2018.
International Search Report and Written Opinion PCT/US2017/064093 dated Feb. 26, 2018.
International Search Report and Written Opinion PCT/US2017/064095 dated Feb. 23, 2018.
International Search Report and Written Opinion PCT/US2017/064096 dated Feb. 26, 2018.
International Search Report and Written Opinion PCT/US2018/039019 dated Sep. 18, 2018.
International Search Report and Written Opinion PCT/US2018/039490 dated Oct. 4, 2018.
International Search Report and Written Opinion PCT/US2018/039494 dated Oct. 11, 2018.
International Search Report and Written Opinion PCT/US2018/040011 dated Oct. 5, 2018.
International Search Report and Written Opinion PCT/US2018/040104 dated Oct. 9, 2018.
International Search Report and Written Opinion PCT/US2018/040126 dated Oct. 9, 2018.
International Search Report and Written Opinion PCT/US2018/040130 dated Sep. 18, 2018.
Notice of Allowance Received for U.S. Appl. No. 16/018,997 dated Oct. 4, 2018.
Office Action Pertaining to U.S. Appl. No. 16/018,918 dated Sep. 28, 2018.
Office Action Pertaining to U.S. Appl. No. 16/018,988 dated Oct. 31, 2018.
Office Action Pertaining to U.S. Appl. No. 16/109,008 dated Oct. 31, 2018.
Office Action Pertaining to U.S. Appl. Serial No. 16/018,918 dated Sep. 28, 2018, 7 PGS.
Invitation to Pay Additional Fees of the European International Searching Authority; PCT/US2019/058316; dated Feb. 14, 2020; 12 Pgs.

* cited by examiner

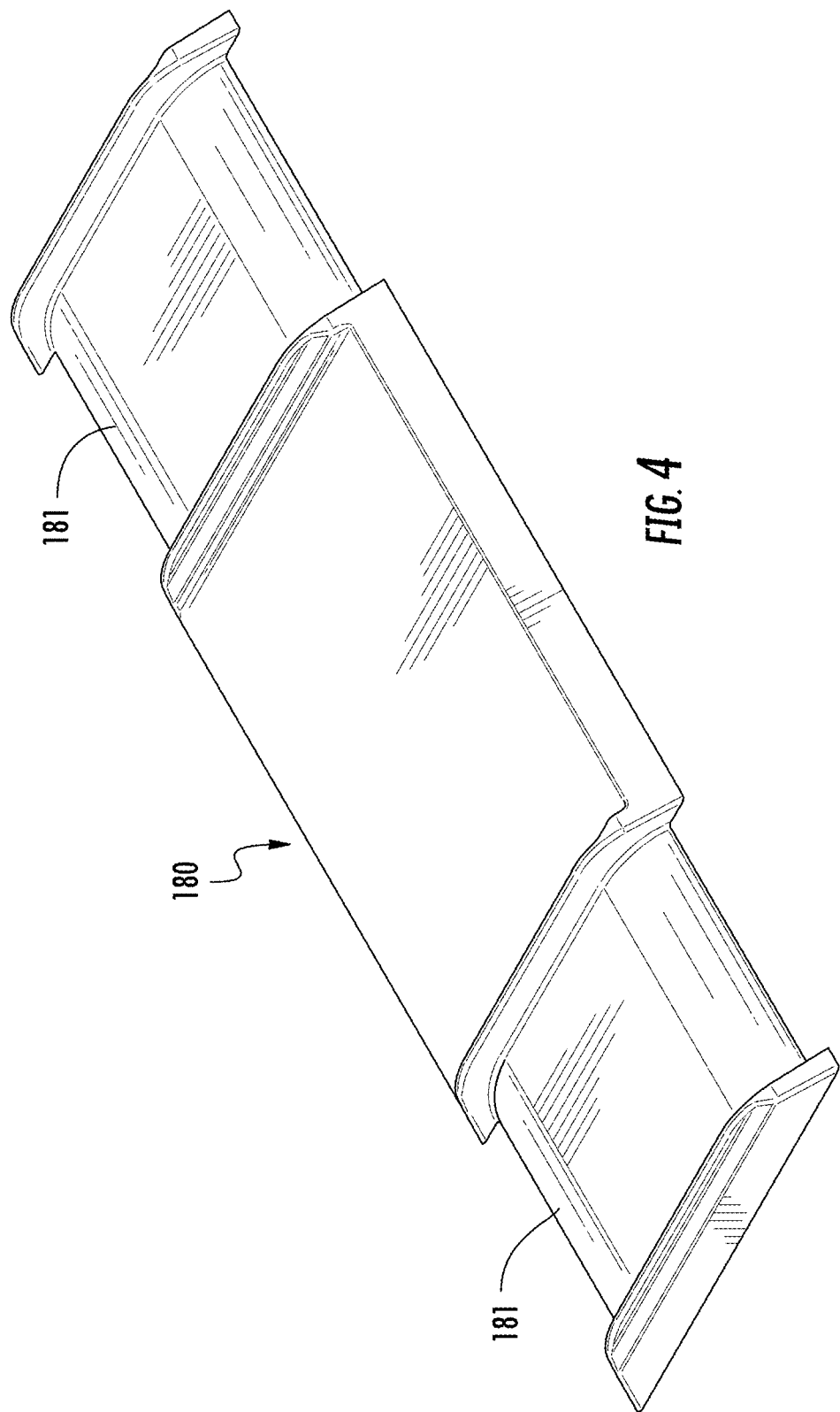

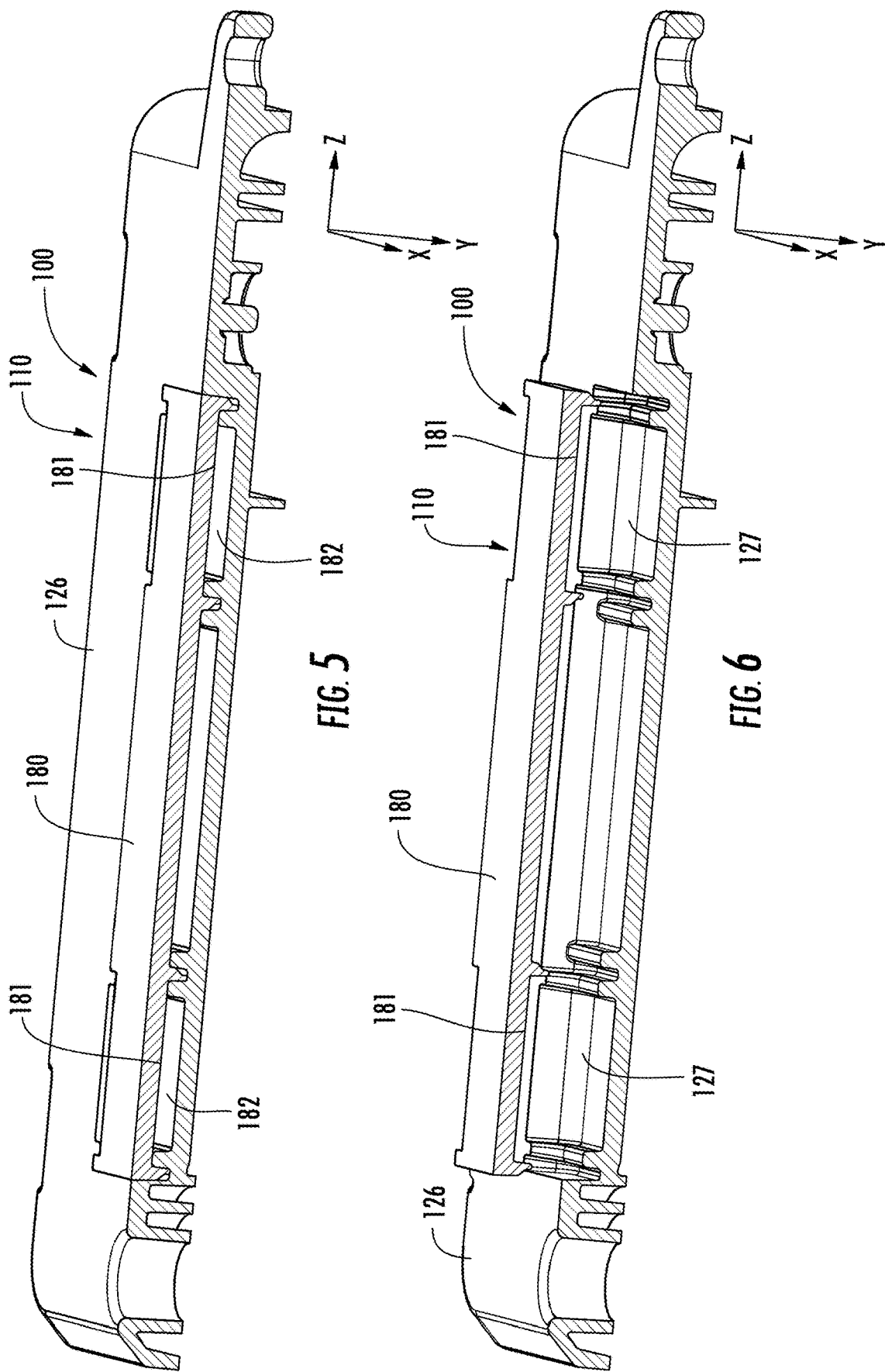

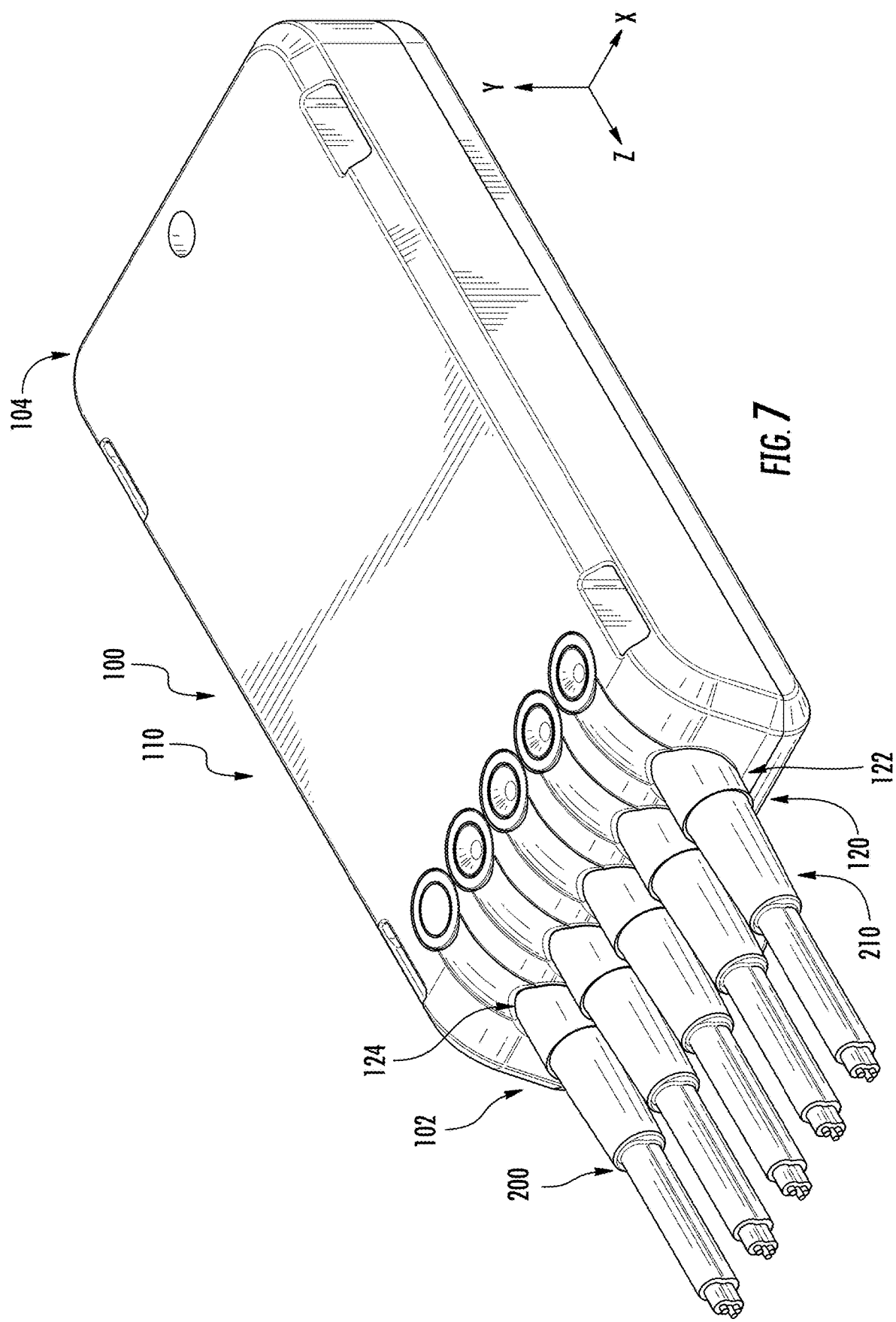

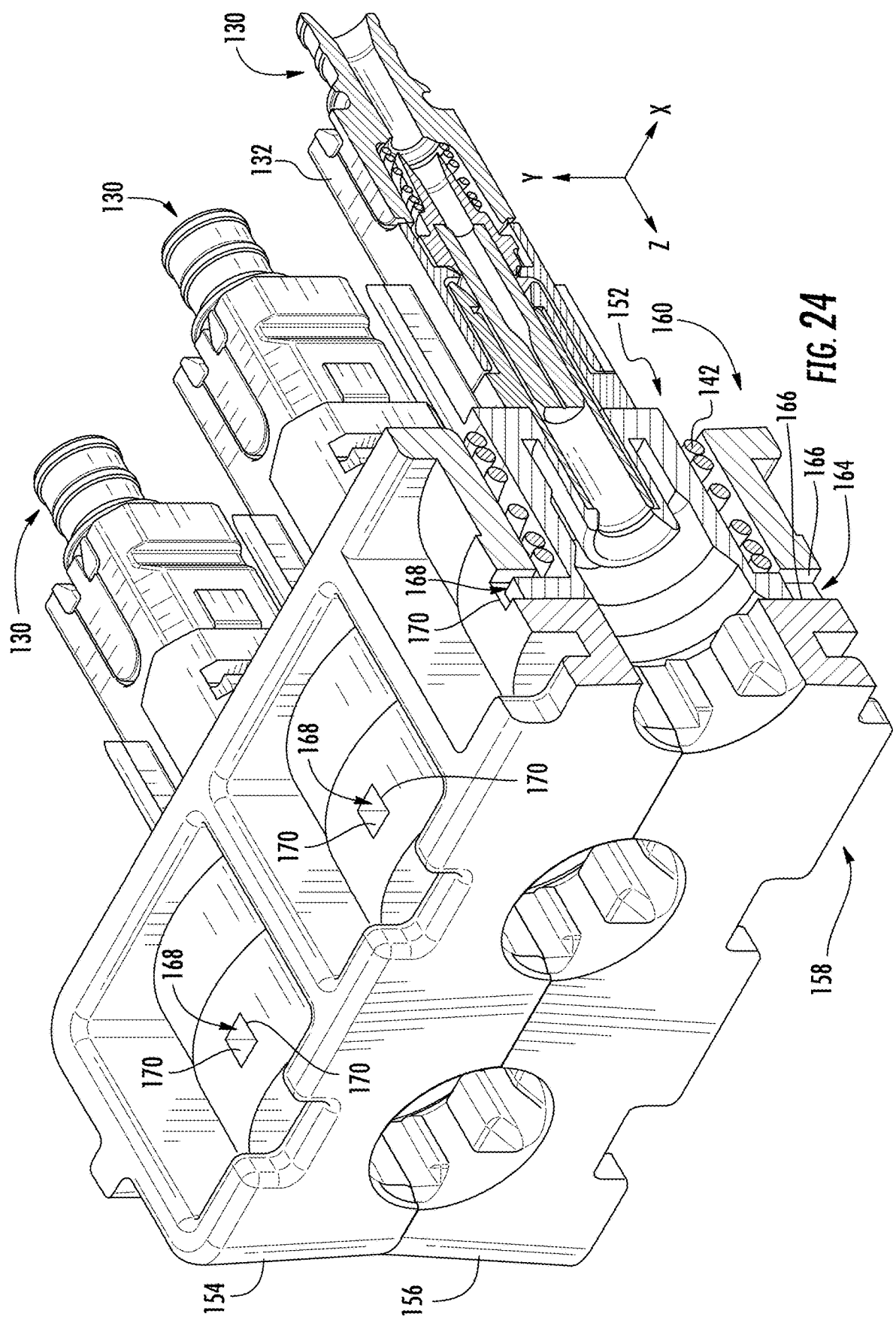

MULTIPORT ASSEMBLIES INCLUDING A MODULAR ADAPTER SUPPORT ARRAY

BACKGROUND

Field

The present disclosure relates generally to assemblies for interconnecting or otherwise terminating optical fibers and more particularly to multiport assemblies for interconnecting dissimilar optical fiber connectors.

Technical Background

Optical fibers are used in an increasing number and variety of applications, such as a wide variety of telecommunications and data transmission applications. As a result, fiber optic networks include an ever increasing number of terminated optical fibers and fiber optic cables that can be conveniently and reliable mated with corresponding optical receptacles in the network. These terminated optical fibers and fiber optic cables are available in a variety of connectorized formats including, for example, hardened OptiTap® and OptiTip® connectors, field-installable UniCam® connectors, preconnectorized single or multi-fiber cable assemblies with SC, FC, or LC connectors, etc., all of which are available from Corning Incorporated, with similar products available from other manufacturers, as is well documented in the patent literature.

The optical receptacles with which the aforementioned terminated fibers and cables are coupled are commonly provided at optical network units (ONUs), network interface devices (NIDs), and other types of network devices or enclosures, and often require hardware that is sufficiently robust to be employed in a variety of environments under a variety of installation conditions. These conditions may be attributable to the environment in which the connectors are employed, or the habits of the technicians handling the hardware. Consequently, there is a continuing drive to enhance the robustness of these connectorized assemblies, while preserving quick, reliable, and trouble-free optical connection to the network.

SUMMARY

According to the subject matter of the present disclosure, fiber optic connectors, connectorized cable assemblies, and methods for the connectorization of cable assemblies are provided.

In one embodiment, a multiport assembly includes a shell defining a cavity positioned within the shell, the shell extending between a front end and a rear end positioned opposite the front end in a longitudinal direction, a plurality of optical adapter assemblies positioned within the cavity of the shell, the plurality of optical adapter assemblies structurally configured to receive, align, and optically couple dissimilar optical connectors, a modular adapter support array engaged with the plurality of optical adapter assemblies and positioned within the cavity, the modular adapter support array defining a plurality of adapter passageways extending through the modular adapter support array in the longitudinal direction, where each adapter passageway of the plurality of adapter passageways extends around at least a portion of a corresponding optical adapter assembly of the plurality of optical adapter assemblies, and a plurality of optical connector ports positioned at the front end of the shell and defining respective connector insertion paths extending inward from the plurality of optical connector ports to the cavity of the shell and permitting optical connectors to access the plurality of optical adapter assemblies engaged with the modular adapter support array.

In another embodiment, a method for assembling a multiport assembly includes engaging a plurality of optical adapter assemblies with a modular adapter support array, where each of the optical adapter assemblies are positioned within corresponding adapter passageways of the modular adapter support array, positioning the plurality of optical adapter assemblies and the modular adapter support array within a cavity of a shell, and aligning the plurality of optical adapter assemblies with a plurality of optical connector ports positioned at a front end of the shell and defining respective connector insertion paths extending inward from the plurality of optical connector ports to the cavity of the shell and permitting optical connectors to access the plurality of optical adapter assemblies engaged with the modular adapter support array.

In yet another embodiment, a multiport assembly includes a shell defining a cavity positioned within the shell, the shell extending between a front end and a rear end positioned opposite the front end in a longitudinal direction, a plurality of optical adapter assemblies positioned within the cavity of the shell, the plurality of optical adapter assemblies structurally configured to receive, align, and optically couple dissimilar optical connectors, a plurality of optical connector ports positioned at the front end of the shell and defining respective connector insertion paths extending inward from the plurality of optical connector ports to the cavity of the shell and permitting optical connectors to access the plurality of optical adapter assemblies, a plurality of push-button securing members associated with respective ones of the connector insertion paths, each push-button securing member of the plurality of push-button securing members being repositionable between an engaged position, in which at least a portion of the push-button securing member intersects the connector insertion path, and a disengaged position, in which the push-button securing member is spaced apart from the connector insertion path, and a plurality of grommets extending around the plurality of push-button securing members, the plurality of grommets extending between the plurality of push-button securing members and the shell, sealing the cavity of the shell as the plurality of push-button securing members move between the engaged position and the disengaged position.

Although the concepts of the present disclosure are described herein with reference to a set of drawings that show a particular type of fiber optic cable, and connector components of particular size and shape, it is contemplated that the concepts may be employed in any optical fiber connectorization scheme including, for example, and without limitation, hardened OptiTap® and OptiTip® connectors, field-installable UniCam® connectors, single or multi-fiber cable assemblies with SC, FC, LC, or multi-fiber connectors, etc.

BRIEF DESCRIPTION OF THE DRAWINGS

The following detailed description of specific embodiments of the present disclosure can be best understood when read in conjunction with the following drawings, where like structure is indicated with like reference numerals and in which:

FIG. 4 schematically depicts the slotted mounting member of FIG. 3 in isolation, according to one or more embodiments shown and described herein;

FIG. 5 schematically depicts a section view of the slotted mounting member and the shell of the multiport assembly along section 5-5 of FIG. 2, according to one or more embodiments shown and described herein;

FIG. 6 schematically depicts a section view of the slotted mounting member and the shell of the multiport assembly along section 6-6 of FIG. 2, according to one or more embodiments shown and described herein;

FIG. 7 schematically depicts a perspective view of the multiport assembly of FIG. 1 with a plurality of optical connectors and an input tether inserted within a plurality of optical connector ports of the multiport assembly, according to one or more embodiments shown and described herein;

FIG. 24 schematically depicts a section view of the multiport assembly along section 24-24 of FIG. 23, according to one or more embodiments shown and described herein.

DETAILED DESCRIPTION

Embodiments described herein are directed to multiport assemblies generally including a plurality of optical adapter assemblies that are positioned within a modular adapter support array. To assemble the multiport assembly, each of the plurality of optical adapter assemblies may first be installed to the modular adapter support array, and then the modular adapter support array and the optical adapter assemblies may be installed within a cavity of a shell of the multiport assembly. By installing all of the optical adapter assemblies within the cavity of the shell at once, the installation of the optical adapter assemblies to the multiport assembly may be simplified as compared to configurations in which the optical adapter assemblies are individually installed to the multiport assembly.

In embodiments, the modular adapter support array includes rotationally-discrete adapter engagement portions that engage corresponding optical adapter assemblies and restrict rotation of the optical adapter assemblies with respect to the modular adapter support array. By restricting rotation of the optical adapter assemblies, rotational alignment between the optical adapter assemblies and optical connectors that are optically coupled to the optical adapter assemblies may be improved, resulting in reduced signal loss between the optical connectors and the optical adapter assemblies. These and other embodiments will now be described with specific reference to the appended drawings.

As used herein, the term "longitudinal direction" refers to the forward-rearward direction of components of the multiport assembly (i.e., in the +/−Z-direction as depicted). The term "lateral direction" refers to the cross-direction of components of the multiport assembly (i.e., in the +/−X-direction as depicted), and is transverse to the longitudinal direction. The term "vertical direction" refers to the upward-downward direction of the components of the multiport assembly (i.e., in the +/−Y-direction as depicted), and is transverse to the lateral and the longitudinal directions.

Figure 1:
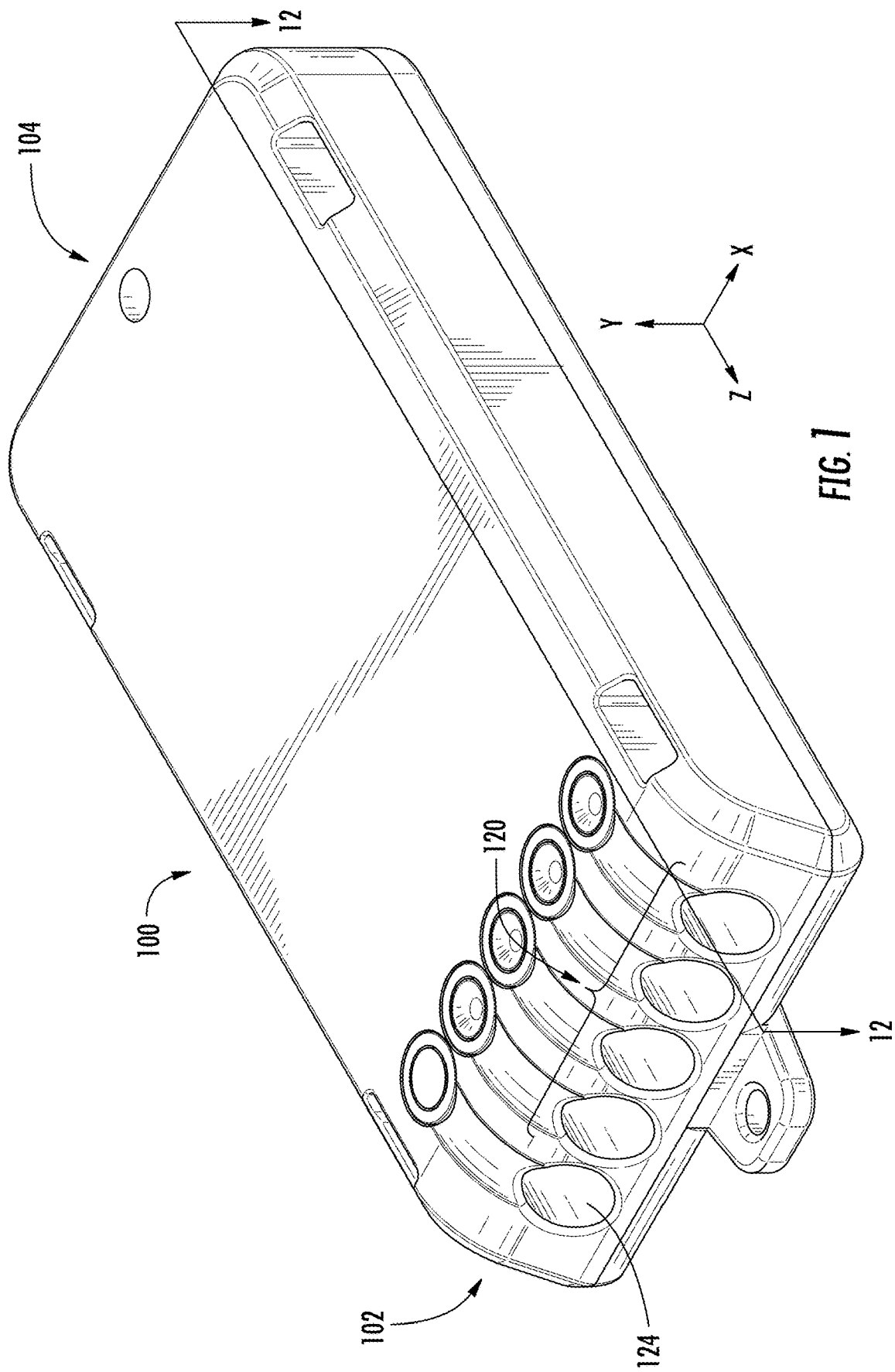
FIG. 1 schematically depicts a perspective view of a multiport assembly, according to one or more embodiments shown and described herein.

Referring initially to FIG. 1, a perspective view of a multiport assembly 100 is schematically depicted. The multiport assembly 100 generally includes a shell 110 that extends between a front end 102 and a rear end 104 in the longitudinal direction and defines a plurality of optical connector ports 120 positioned at the front end 102 of the multiport assembly 100. A plurality of optical connectors may be inserted within the plurality of optical connector ports 120 as described in greater detail herein. In some embodiments, the shell 110 defines an input connector port 124 positioned at the front end 102 of the multiport assembly 100. An input connector, such as an input tether may be inserted within the input connector port 124, as described in greater detail herein.

Figure 2:
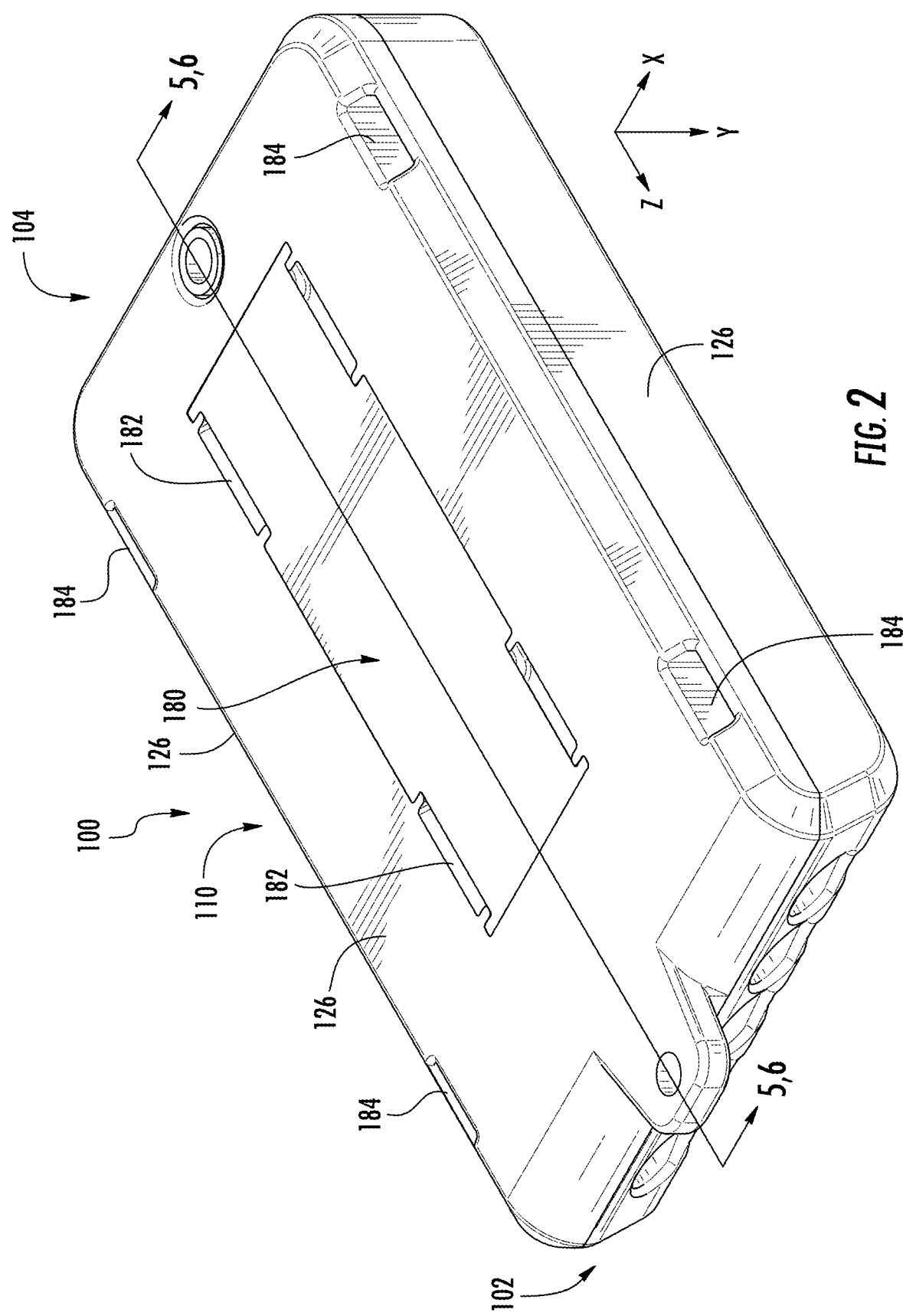
FIG. 2 schematically depicts a bottom perspective view of the multiport assembly of FIG. 1, according to one or more embodiments shown and described herein.

Referring to FIG. 2, a bottom perceptive view of the multiport assembly 100 is schematically depicted. The shell 110 generally defines at least one outward-facing surface 126, and includes at least one slot 182 defined on the outward-facing surface 126. A band, a belt, or the like may be passed through the at least one slot 182 to fasten the multiport assembly 100 to an object, such as a post, a utility pole, or the like. While the embodiment depicted in FIG. 2 includes the at least one slot 182 defined on the lower surface of the shell 110, it should be understood that the at least one slot 182 may be positioned on any outward-facing surface 126 of the shell 110.

The shell 110 may also define one or more perimeter through slots 184 extending through the shell 110 in the vertical direction that may also receive a band or belt to fasten the multiport assembly 100 to a post or utility pole. In some embodiments, the shell 110 further includes a bushing 186 extending through the shell 110. A mechanical fastener, such as a screw or the like may be passed through the bushing 186 to fasten the multiport assembly 100 to an object, such as a utility pole or the like, and the bushing 186 may resist forces applied to the shell 110 by the mechanical fastener.

Figure 3:
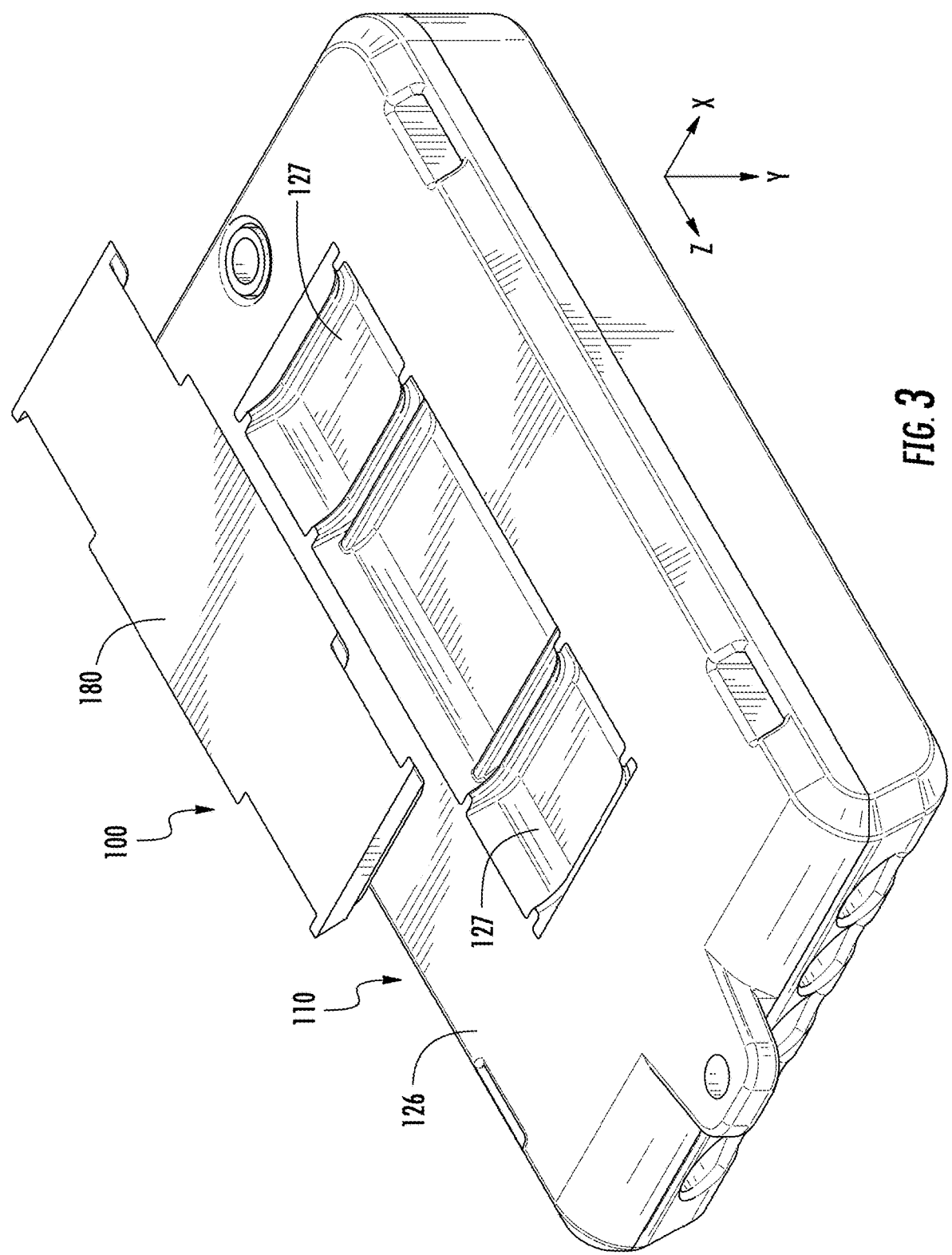
FIG. 3 schematically depicts a bottom perspective view of the multiport assembly of FIG. 1 with a slotted mounting member, according to one or more embodiments shown and described herein.

Referring collectively to FIGS. 3 and 4, an exploded view of the shell 110 of the multiport assembly 100 and a perspective view of a slotted mounting member 180 are schematically depicted, respectively. In embodiments, the slotted mounting member 180 may be selectively coupled to the outward-facing surface 126 of the shell 110, and the slotted mounting member 180 defines the at least one slot 182 (FIG. 2) on the shell 110. In particular, the slotted mounting member 180 may include one or more troughs 181 that cooperate with a recessed portion 127 of the outward-facing surface 126 of the shell 110 to form the at least one slot 182 (FIG. 2). The slotted mounting member 180 may be selectively coupled to the outward-facing surface 126 with a snap-fit or the like.

Referring to FIGS. 5 and 6, a section view of the multiport assembly 100 along sections 5-5 and 6-6 of FIG. 2 are depicted, showing the slotted mounting member 180 selectively coupled to the shell 110 and spaced apart from the shell 110, respectively. In the embodiment depicted in FIGS. 5 and 6, the at least one slot 182 is defined by the slotted mounting member 180 and a recessed portion 127 of the outward-facing surface 126, such that the at least one slot 182 is positioned between the one or more troughs 181 of the slotted mounting member 180 and the recessed portion 127 of the outward-facing surface 126. In other embodiments, the at least one slot 182 (FIG. 2) may be defined by and positioned solely within the slotted mounting member 180.

Because the slotted mounting member 180 is selectively coupled to the outward-facing surface 126, the slotted mounting member 180 may be fastened to a post or utility pole, such as by a belt or a band. The multiport assembly 100 may then be selectively coupled to the slotted mounting member 180, and accordingly coupled to the post or utility pole by the slotted mounting member 180. The slotted mounting member 180 is generally smaller than the shell 110 of the multiport assembly 100, and accordingly, may be easier to manipulate and fasten to a post or utility pole. As such, by fastening the slotted mounting member 180 to the post or utility pole first, and then coupling the shell 110 to the slotted mounting member 180, installation of the multiport assembly 100 to the post or utility pole may be simplified. Furthermore, the geometry of the at least one slot 182 (FIG. 2) may be difficult to form within a shell, particularly in configurations in which the shell is formed as a unitary body through a molding process. By forming the at least one slot 182 (FIG. 2) via one or more troughs 181 formed within the shell 110 and a slotted mounting member 180 that is separate from the shell 110, the geometries of the separate components forming the at least one slot 182 (i.e., the slotted mounting member 180 and the one or more troughs 181) are simplified as compared to the geometry of a unitary shell defining a slot, which may reduce production costs.

Referring to FIG. 7, a perspective view of the multiport assembly 100 is depicted with a plurality of optical connectors 210 inserted within corresponding optical connector ports 120 of the multiport assembly 100. In the embodiment depicted in FIG. 7, an input tether 200 is inserted within input connector port 124. While in the embodiment depicted in FIG. 7, the input connector port 124 is positioned at the front end 102 of the multiport assembly 100, it should be understood that the input connector port 124 may be positioned at any suitable location on the multiport assembly 100.

Figure 8:
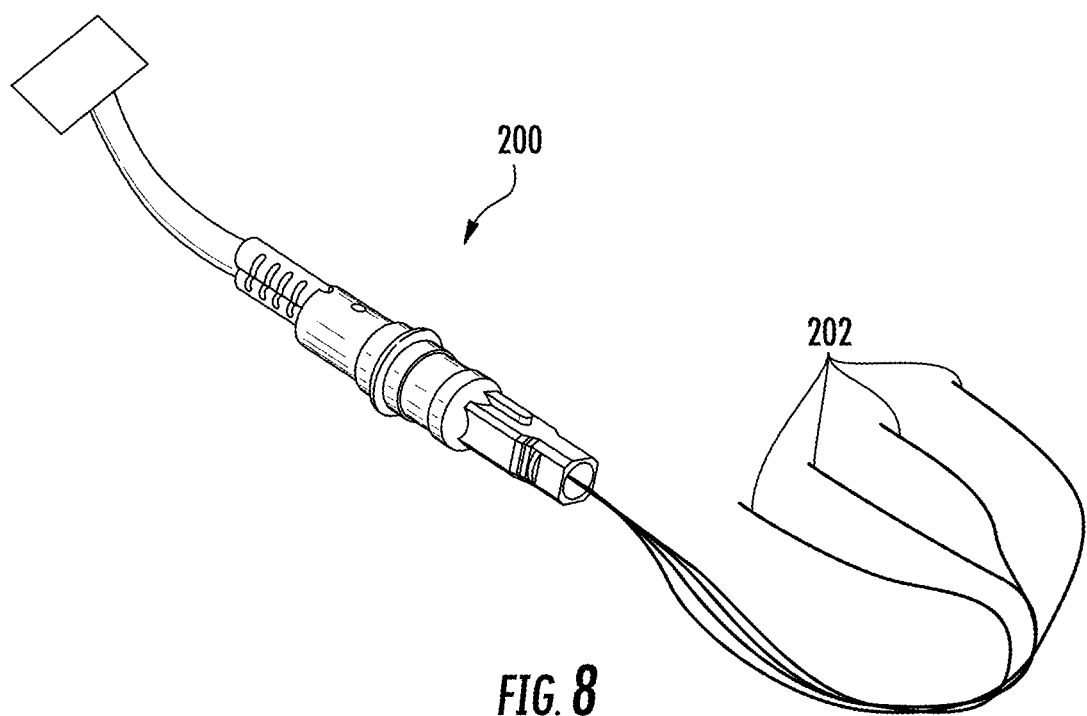
FIG. 8 schematically depicts the input tether of FIG. 7 in isolation, according to one or more embodiments shown and described herein.

Referring to FIG. 8, the input tether 200 is depicted in isolation. The input tether 200 may generally include a plurality of optical fibers 202 therein, which may be terminated within the multiport assembly 100, for example at corresponding optical adapter assemblies, as described in greater detail herein. In some embodiments, the input tether 200 may include a furcation body that generally includes a portion of the input tether 200 that transitions to the individual fibers 202 for routing within a cavity of the shell 110 to facilitate connection to corresponding optical adapter assemblies. In some embodiments, input tether 200 may terminate with a fiber optic connector or be a stubbed cable as desired. For instance, the input tether 200 could be an OptiTip® connector for optical connection to previously installed distribution cables; however, other suitable single-fiber or multi-fiber connectors may be used for terminating the input tether 200 as desired. While the embodiment depicted in FIG. 8 depicts an input tether 200 including a plurality of optical fibers 202, it should be understood that in other embodiments, the input tether 200 may include a single optical fiber, as described in greater detail herein.

Figure 9:
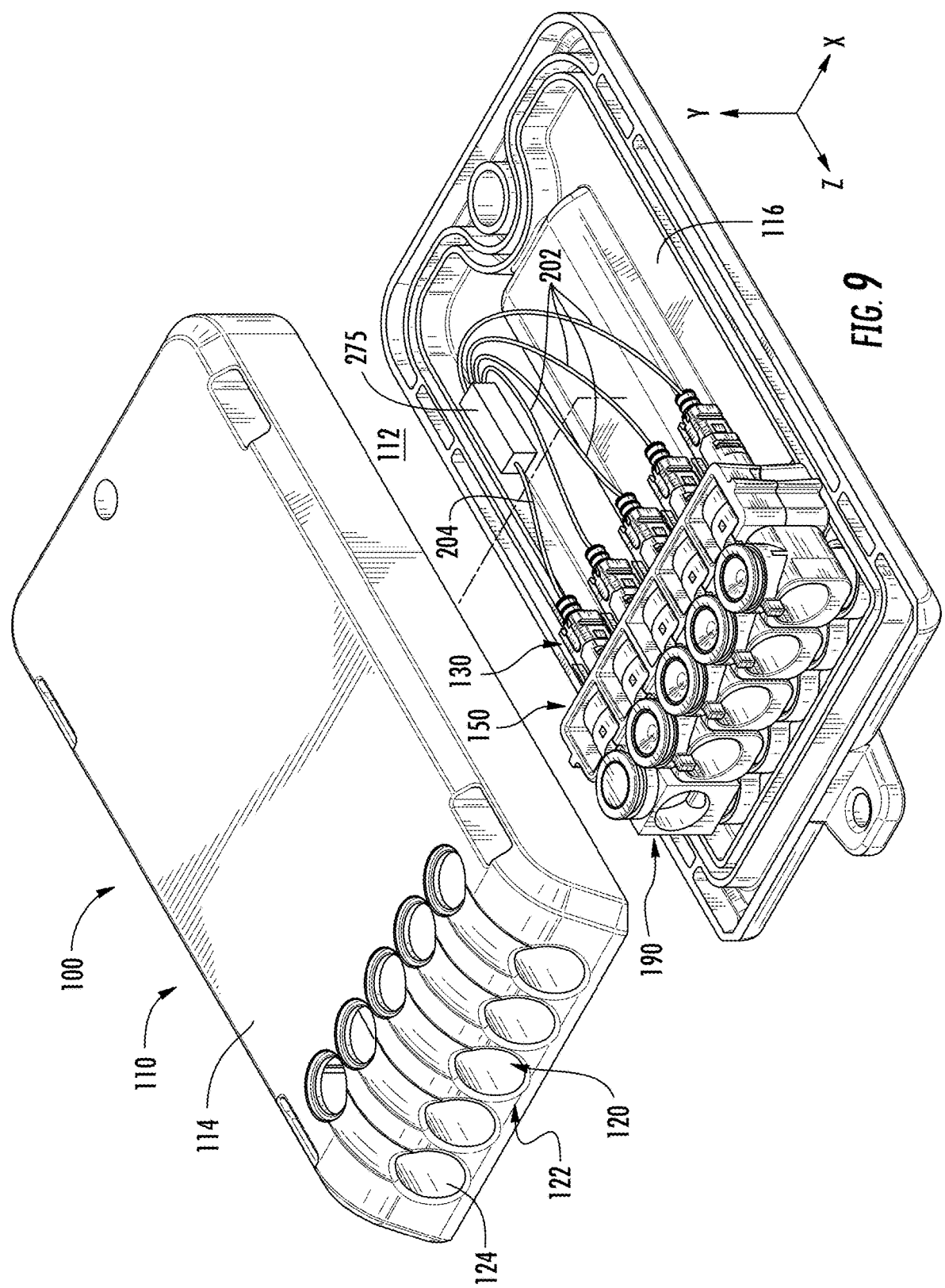
FIG. 9 schematically depicts an exploded view of the multiport assembly of FIG. 1, according to one or more embodiments shown and described herein.

Referring to FIG. 9, an exploded perspective view of the multiport assembly 100 is depicted. In some embodiments, an optical splitter 275 may be positioned within the cavity 112, and may split a signal from a single optical fiber 204 into a plurality of optical fibers 202. In particular, the optical splitter 275 may receive a single optical fiber 204, for example from an input tether 200 (FIG. 8), and may split a signal from the optical fiber 204 into a plurality of optical fibers 202 that extend between the optical splitter 275 and the plurality of optical adapter assemblies 130. In one example, the splitter 275 allows a single optical signal to be split into multiple signals such as 1×N split, but other splitter arrangements are possible such as a 2×N split. In the embodiment depicted in FIG. 9, a signal from the single optical fiber 204 is split by the splitter 275 to four optical fibers 202 extending between the splitter 275 and four optical adapter assemblies 130.

The shell 110 generally includes an upper shell member 114 coupled to a lower shell member 116, the upper shell member 114 and the lower shell member 116 defining a cavity 112 positioned within the shell 110. In embodiments, the upper shell member 114 and the lower shell member 116 may be formed from any suitable material, such as a polymer, a composite, a resin, or the like, and may be formed through any suitable process, such as and without limitation molding or the like. The shell 110 of the multiport assembly 100 may optionally be weatherproofed by appropriately sealing the upper shell member 114 to the lower shell member 116. The optical connector ports 120 and the input connector port 124 may also be sealed with the plurality of optical connectors 210 and the input tether 200, respectively, using any suitable means such as gaskets, O-rings, adhesive, sealant, welding, overmolding or the like. If the multiport assembly 100 is intended for indoor applications, then the weatherproofing may not be required.

In one embodiment, to seal the upper shell member 114 and the lower shell member 116 together, a heat soluble resin may be utilized. The heat soluble resin can be in the form of a thermoplastic cord containing magnetically active particles. For example, the heat soluble resin can be placed in a groove defined by the upper shell member 114 and/or the lower shell member 116, and the upper shell member 114 and the lower shell member 116 may be pressed toward each other. An induced energy may then be applied to heat the heat soluble material (also referred to herein as a resin) causing the heat soluble material to soften and then re-harden after cooling, thereby making a strong seal at the housing interface. Typically, the strength seal (e.g., the cord of thermoplastic) extends entirely around a perimeter of the upper shell member 114 and the lower shell member 116; however, in some applications the cord does not extend entirely around the perimeter. The resin can include magnetically active particles and the induced energy can be a radio frequency (RF) electromagnetic field which induces eddy currents in the magnetically active pieces. The eddy currents flowing in the magnetically active particles heat the magnetically active particles which cause the heat soluble material to soften and bond with the upper shell member 114 and the lower shell member 116. The RF field is then turned off, and when the heat soluble material cools off, the heat soluble material hardens, and thus, the upper shell member 114 and the lower shell member 116 are welded together. One exemplary process employs EMABOND™, commercially available from the Ashland Specialty Chemical company of Ohio as the heat soluble material with embedded magnetically active particles.

Still referring to FIG. 9, the multiport assembly 100 generally includes a plurality of push-button securing members 190 associated with each of the optical connector ports 120 and the input connector port 124. The plurality of push-button securing members 190 are structurally configured to engage the input tether 200 and/or the plurality of optical connectors 210 and retain at least a portion of the input tether 200 and/or the plurality of optical connectors 210 within the cavity 112 of the multiport assembly 100. In embodiments, the plurality of push-button securing members 190 selectively retain the plurality of optical connectors 210 and/or the input tether 200 within the cavity 112 of the multiport assembly 100. In the embodiment depicted in FIG. 9, the input tether 200 and the plurality of optical connectors 210 are each selectively retained within the cavity 112 of the multiport assembly 100 by the plurality of push-button securing members. In other embodiments, the plurality of optical connectors 210 may be selectively retained within the cavity 112 of the multiport assembly 100 by the plurality of push-button securing members 190, while the input tether 200 is rigidly connected to the multiport assembly 100 (i.e., the input tether 200 is not generally removable from the multiport assembly 100 without dis-assembling the multiport assembly 100). The input tether 200 and/or the optical connectors 210 may be secured to the multiport assembly 100 in other suitable manners such as adhesive, a collar or crimp, heat shrink or combinations of the same.

The multiport assembly 100 further includes a plurality of optical adapter assemblies 130 and a modular adapter support array 150 positioned within the cavity 112 of the shell 110. The term "modular" as used herein with respect to the modular adapter support array 150 indicates that the modular adapter support array 150 is separate from the shell 110 and may be removed from and inserted to the shell 110 in a non-destructive manner. For example, the optical adapter assemblies 130 may be installed to the modular adapter support array 150, and the modular adapter support array 150 and the optical adapter assemblies 130 may then be installed to the shell 110 as an assembled unit, the optical adapter assemblies 130 and the modular adapter support array 150 being movable with respect to the shell 110, as described in greater detail herein. As described in greater detail herein, the plurality of optical adapter assemblies 130 are structurally configured to receive, align, and optically couple dissimilar optical connectors. In embodiments each of the plurality of optical adapter assemblies 130 are aligned with a corresponding optical connector port of the plurality of optical connector ports 120 and/or with the input connector port 124.

Figure 10:
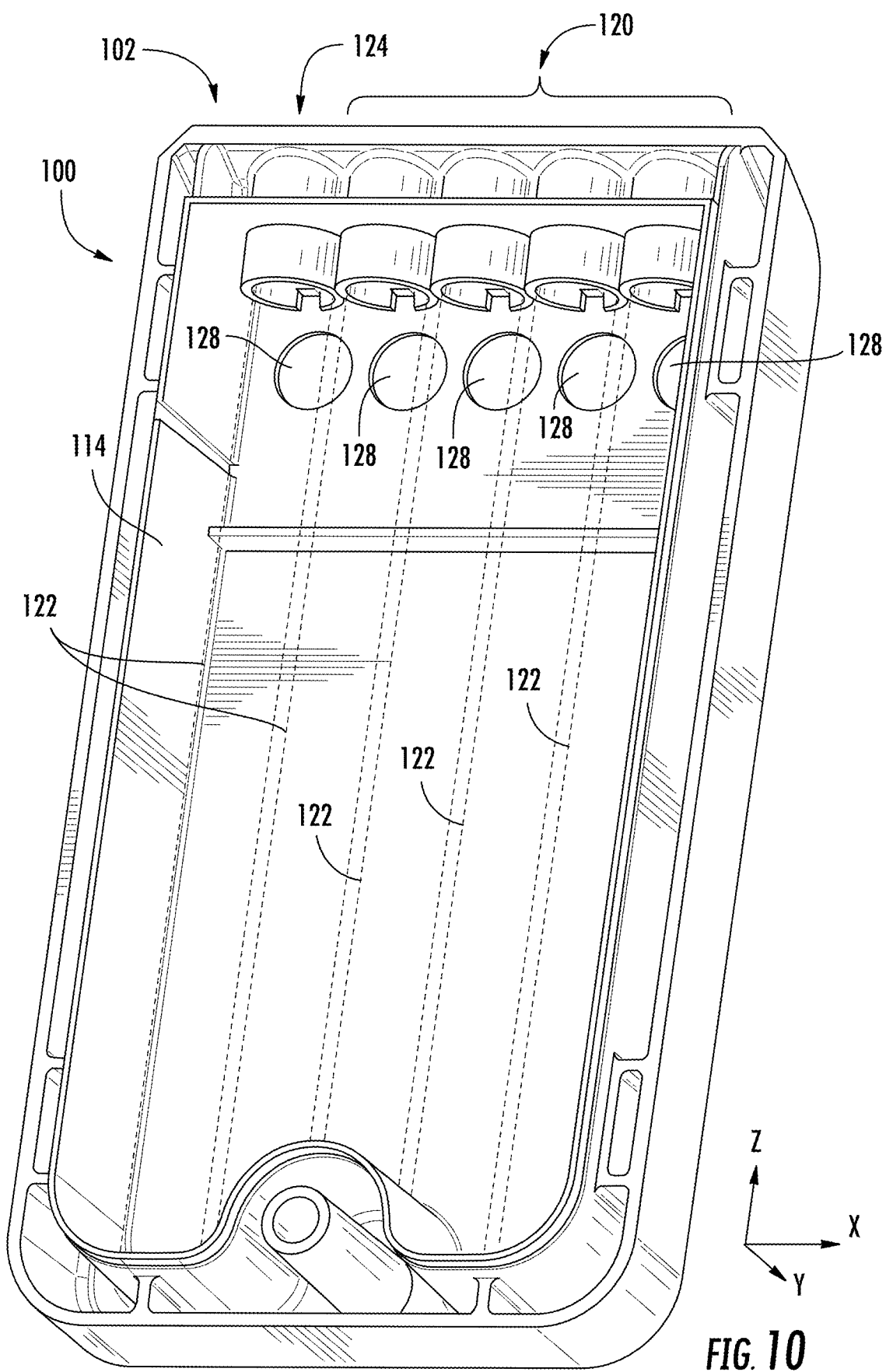
FIG. 10 schematically depicts a perspective view of an upper shell member of the shell of FIG. 1, according to one or more embodiments shown and described herein.

Referring to FIG. 10, a perspective view of the upper shell member 114 is schematically depicted. In embodiments, the upper shell member 114 includes the plurality of plurality of optical connector ports 120 and the input connector port 124 positioned at the front end 102 of the upper shell member 114. In other embodiments, the lower shell member 116 (FIG. 9) may include the plurality of optical connector ports 120 and the input connector port 124. Each of the plurality of optical connector ports 120 and the input connector port 124 define a connector insertion path 122 through which the optical connectors 210 (FIG. 7) and/or the input tether 200 (FIG. 7) may be inserted, permitting the optical connectors 210 to access the plurality of optical adapter assemblies 130 (FIG. 9). The plurality of push-button securing members 190 (FIG. 9) selectively interrupt the connector insertion paths 122 to secure the optical connectors 210 (FIG. 7) and/or the input tether 200 (FIG. 7), as described in greater detail herein.

In some embodiments, the upper shell member 114 defines a plurality of upper apertures 128, through which at least a portion of the plurality of push-button securing members 190 (FIG. 9) may extend. For example, at least a portion of the plurality of push-button securing members 190 (FIG. 9) may extend through the plurality of upper apertures 128, such that a user may reposition the plurality of push-button securing members 190 between an engaged position, in which the plurality of push-button securing members 190 may retain the input tether 200 (FIG. 7) and/or the plurality of optical connectors 210 (FIG. 7) within the multiport assembly 100, and a disengaged position, in which the input tether 200 and/or the plurality of optical connectors 210 may be removable from the multiport assembly 100. In the embodiment depicted in FIG. 10, the plurality of upper apertures 128 are oriented transverse to the input connector port 124 and the plurality of optical connector ports 120, and the plurality of upper apertures 128 are positioned on a different surface of the upper shell member 114 than the input connector port 124 and the plurality of optical connector ports 120. In other embodiments, the input connector port 124 and the plurality of optical connector ports 120 are positioned on the same surface of the upper shell member 114 as the plurality of upper apertures 128.

Figure 11:
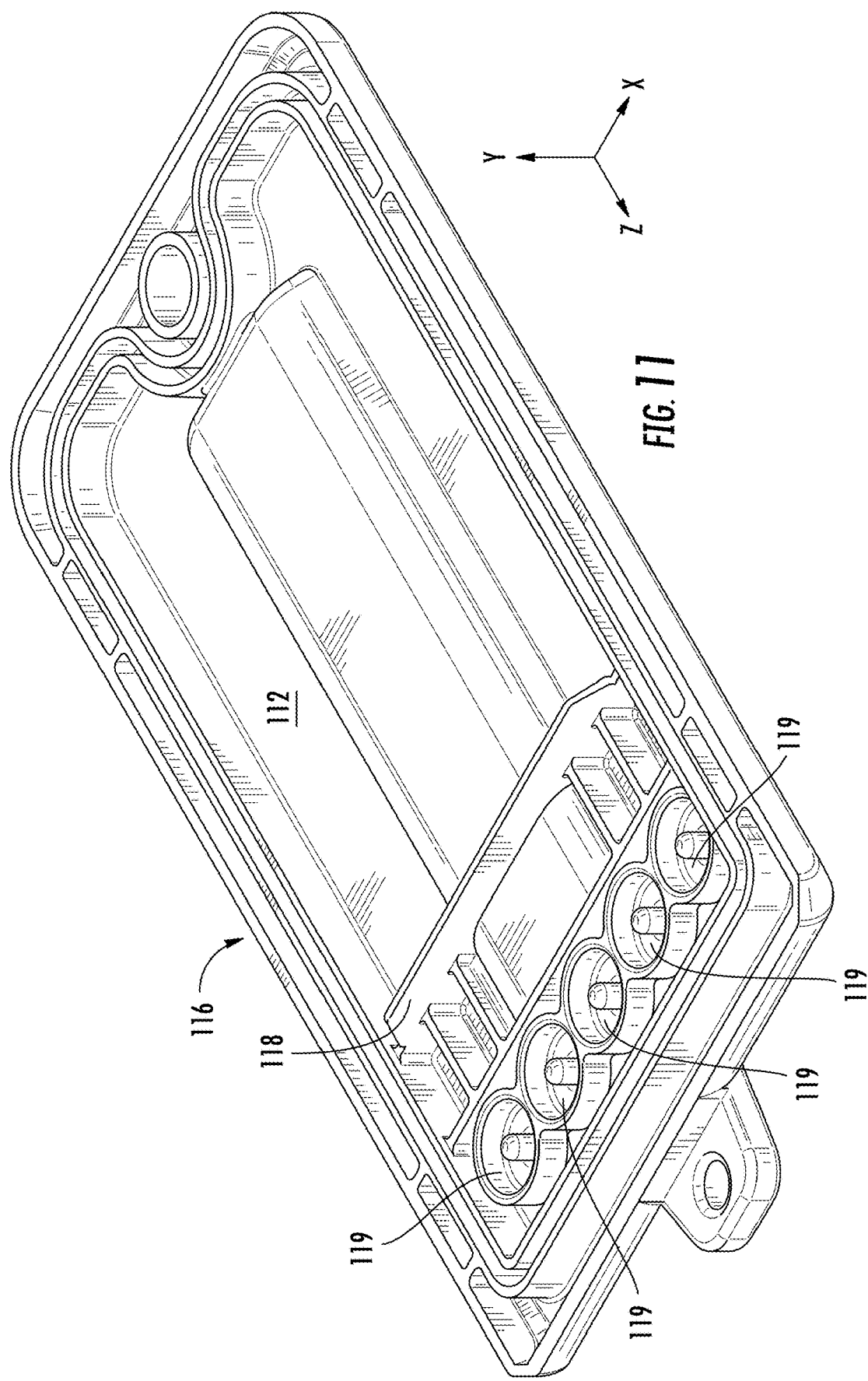
FIG. 11 schematically depicts a perspective view of a lower shell member of the shell of FIG. 1, according to one or more embodiments shown and described herein.

Referring now to FIG. 11, a perspective view of the lower shell member 116 is depicted in isolation. In embodiments, the lower shell member 116 defines a biasing member engagement surface 118 positioned within the cavity 112 of the lower shell member 116 and oriented to face forward in the longitudinal direction (i.e., in the +Z-direction as depicted). Biasing members of the plurality of optical adapter assemblies 130 (FIG. 9) may engage the biasing member engagement surface 118, as described in greater detail herein. In embodiments, the lower shell member 116 additionally defines securing member recesses 119 that engage the plurality of push-button securing members 190 (FIG. 9).

Figure 12:
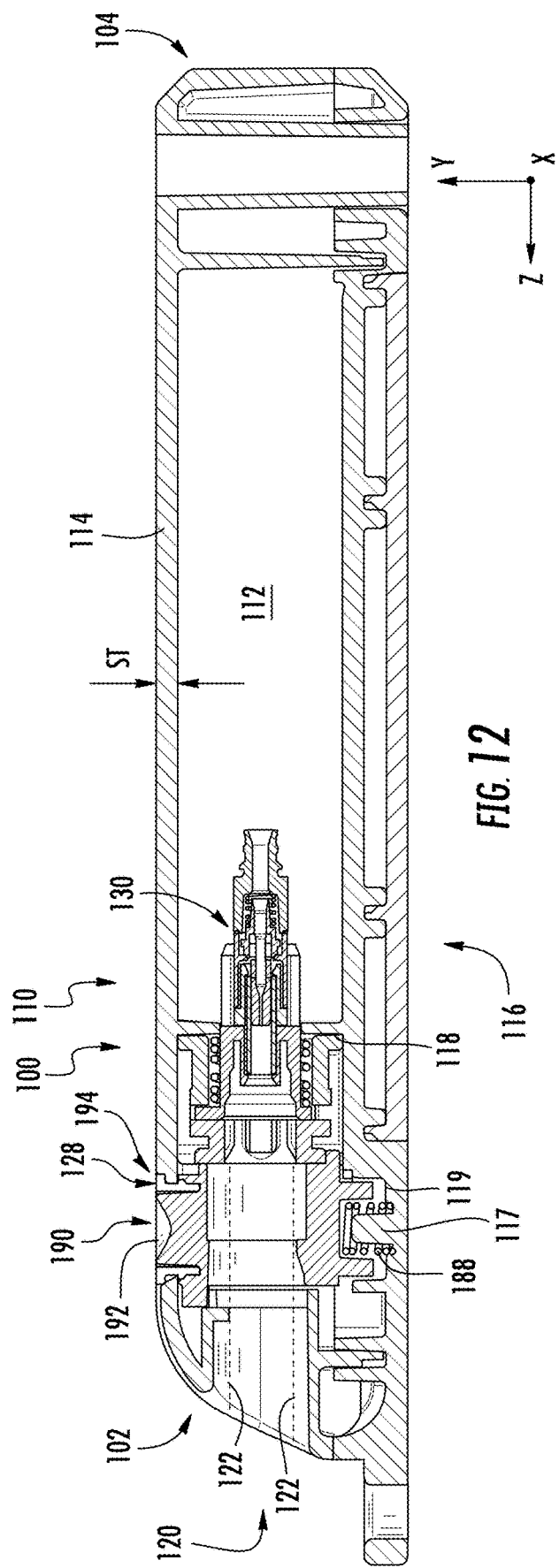
FIG. 12 schematically depicts a section view of the multiport assembly along section 12-12 of FIG. 1, according to one or more embodiments shown and described herein.

Referring to FIG. 12, a section view of the multiport assembly 100 is depicted along section 12-12 of FIG. 1. Each of the connector insertion paths 122 are generally aligned with a corresponding optical adapter assembly 130, such that optical fibers of optical connectors 210 (FIG. 7) inserted into the multiport assembly 100 along a connector insertion path 122 may be aligned with a corresponding optical adapter assembly 130. In embodiments, each of the optical adapter assemblies 130 are structurally configured to receive, align, and optically couple dissimilar optical connectors. For example, the optical adapter assemblies 130 are configured to receive an optical connector 210 (FIG. 7) on one side, and optically couple the optical connector 210 (FIG. 7) to another optical fiber engaged with and/or optically coupled to the optical adapter assembly 130, such as an optical fiber 202 (FIG. 8) of the input tether 200 (FIG. 8) that is optically coupled to the other side of the optical adapter assembly 130.

As depicted, push-button securing members 190 are positioned within the shell 110 and intersect the connector insertion paths 122. In particular, each of the push-button securing members 190 are repositionable with respect to the shell 110 in the vertical direction between an engaged position, in which at least a portion of the push-button securing members 190 are positioned within a corresponding connector insertion path 122, and a disengaged position, in which the push-button securing members 190 is spaced apart from the connector insertion path 122. By moving each of the push-button securing members 190 in and out of a corresponding connector insertion path 122, the push-button securing members 190 may selectively engage the input tether 200 (FIG. 7) and the optical connectors 210 (FIG. 7) and retain the input tether 200 and the optical connectors 210 within the shell 110.

Figure 13:
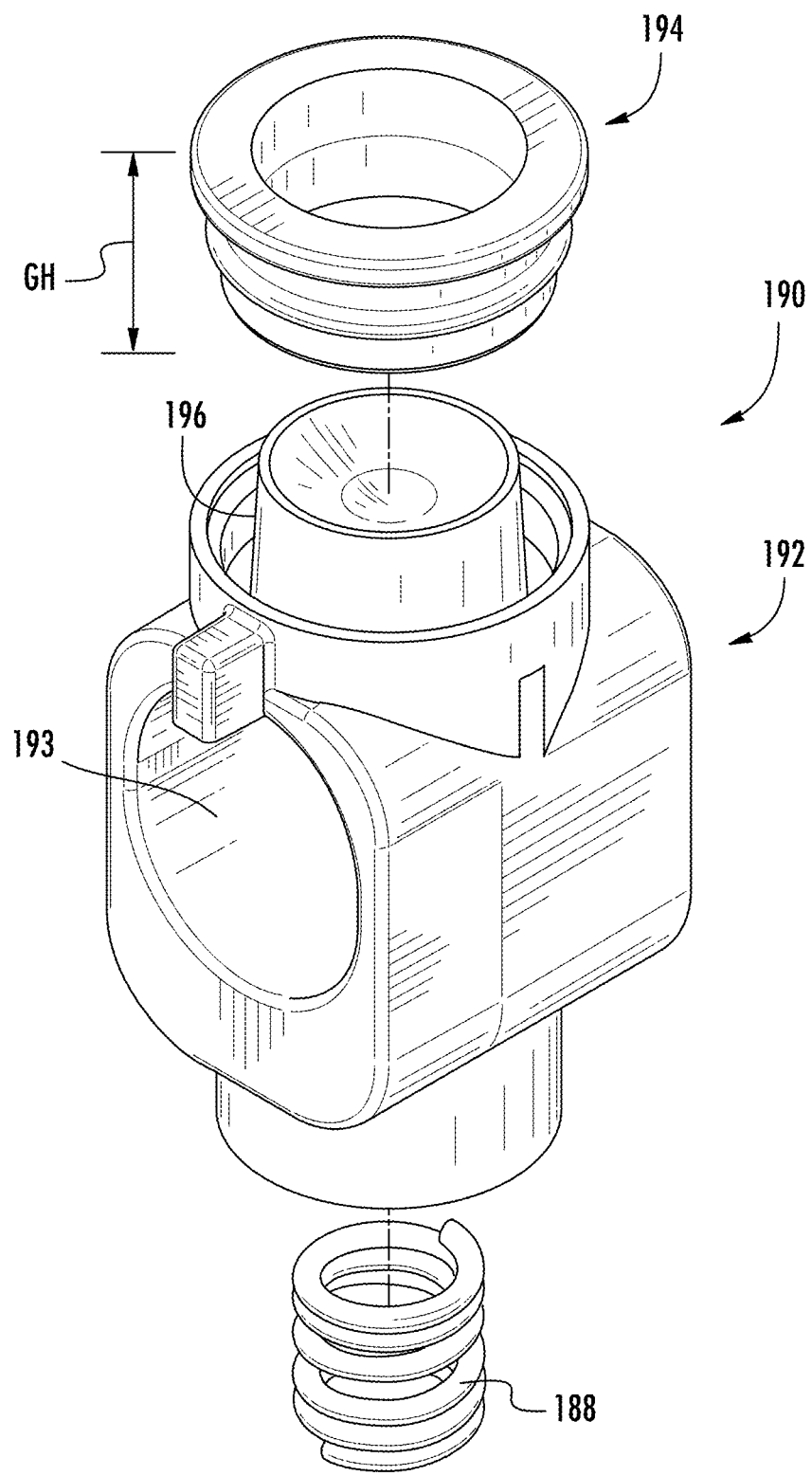
FIG. 13 schematically depicts an exploded view of a push-button securing member of the multiport assembly of FIG. 1, according to one or more embodiments shown and described herein.

Referring collectively to FIGS. 12 and 13, the section view of the multiport assembly 100 along section 12-12 of FIG. 1 and a perspective view of a push-button securing member 190 in isolation are depicted, respectively. Each push-button securing member 190 generally includes a securing member body 192 that defines a bore 193 extending through the securing member body 192. In embodiments, at least a portion of the input tether 200 (FIG. 7) or an optical connector 210 (FIG. 7) may be inserted within the bore 193 as the input tether 200 or the optical connector 210 is inserted within the multiport assembly 100. Each of the push-button securing members 190 may include one or more retention features configured to engage the input tether 200 (FIG. 7) or the optical connector 210 (FIG. 7) and retain the input tether 200 or the optical connector 210 within the multiport assembly 100.

In embodiments, the multiport assembly 100 includes securing member biasing members 188 that are each engaged with a corresponding push-button securing member 190. The securing member biasing members 188 are positioned within the securing member recess 119 of the lower shell member 116. For example in some embodiments, each of the securing member recesses 119 include a post 117 that engages and retains a corresponding securing member biasing member 188. Each of the securing member biasing members 188 may bias a corresponding push-button securing member 190 upward in the vertical direction and into the engaged position. A user may depress the securing member body 192 downward in the vertical direction to overcome the bias of the securing member biasing member 188 and reposition the push-button securing member 190 into the disengaged position. The securing member biasing member 188 may include any suitable biasing member, for example and without limitation, a compression spring, a tension spring, a torsion spring, or the like.

In embodiments, the multiport assembly 100 further includes grommets 194 extending around and engaged with corresponding push-button securing members 190. Each of the grommets 194 are generally positioned between a corresponding push-button securing member 190 and the upper shell member 114 of the shell 110. The grommets 194 may generally be formed of an elastically deformable material, such as a rubber, a polymer, a composite, or the like. In embodiments, the grommets 194 may remain stationary with respect to the shell 110 in the vertical direction as the push-button securing members 190 move between the engaged position and the disengaged position to seal the cavity 112 as the push-button securing members 190 move between the engaged position and the disengaged position.

In particular, each of the grommets 194 include and extend inward toward the cavity 112 of the shell 110 by a grommet height "GH" evaluated in the vertical direction. The grommet height GH is selected to correspond to a travel distance evaluated between the engaged position and the disengaged position of the plurality of push-button securing members 190. For example, in some embodiments, each of the push-button securing members 190 define a grommet engagement surface 196 that is positioned within and engaged with the grommet 194. As each of the push-button securing members 190 move up and down in the vertical direction between the engaged position and the disengaged position, the grommet engagement surface 196 may move with respect to its corresponding grommet 194, but will remain in contact with its corresponding grommet 194. In this way, the grommets 194 may seal the cavity 112 as the push-button securing members 190 move between the engaged position and the disengaged position.

Because the grommets 194 seal the cavity 112 while remaining stationary with respect to the shell 110 as the push-button securing members 190 move between the engaged position and the disengaged position, manufacturing of the shell 110 may be simplified. For example, in some configurations, push-button securing members 190 may be sealed within the shell by an o-ring or the like that travels up and down with the push button securing member. To form a seal between the push-button securing member and the shell, in these configurations, the shell may generally include an increased thickness and/or an engagement feature positioned around the push-button securing members to ensure engagement between the o-rings of the push-button securing members and the shell as the push-button securing members move upward and downward in the vertical direction. The geometry of the increased thickness and/or engagement feature of the shells may be difficult to manufacture within desired tolerances, particularly when the shell is formed through a molding process.

By contrast and referring to FIG. 12, in embodiments, a shell thickness "ST" of the upper shell member 114 evaluated in the vertical direction may be relatively constant throughout the upper shell member 114. Because the grommets 194 each include the grommet height GH (FIG. 13) extending inward into the cavity 112 of the shell 110, the grommets 194 may each remain stationary with respect to the shell 110 but engaged with the push-button securing members 190 as the push-button securing members 190 move between the engaged position and the disengaged position, maintaining a seal between the push-button securing member 190 and the grommet 194. Accordingly, the grommets 194 reduce and/or eliminate the need for an increased thickness to be formed on the shell 110 to ensure engagement between the push-button securing members 190 and the shell 110 as the push-button securing members 190 move between the engaged position and the disengaged position. Instead, the shell thickness ST of the upper shell member 114 may be relatively constant throughout the upper shell member 114, thereby simplifying manufacturing processes and reducing manufacturing costs.

Furthermore, in some embodiments, the grommets 194 may be color-coded. For example, the grommet 194 associated with the push-button securing member 190 of the input connector port 124 (FIG. 9) may include a color different than the grommets 194 associated with the push button securing members 190 of the optical connector ports 120 (FIG. 9). By including grommets 194 of different colors, the grommets 194 may provide a visual indication to a user identifying the input connector port 124 (FIG. 9) and the optical connector ports 120 (FIG. 9).

Figure 14:
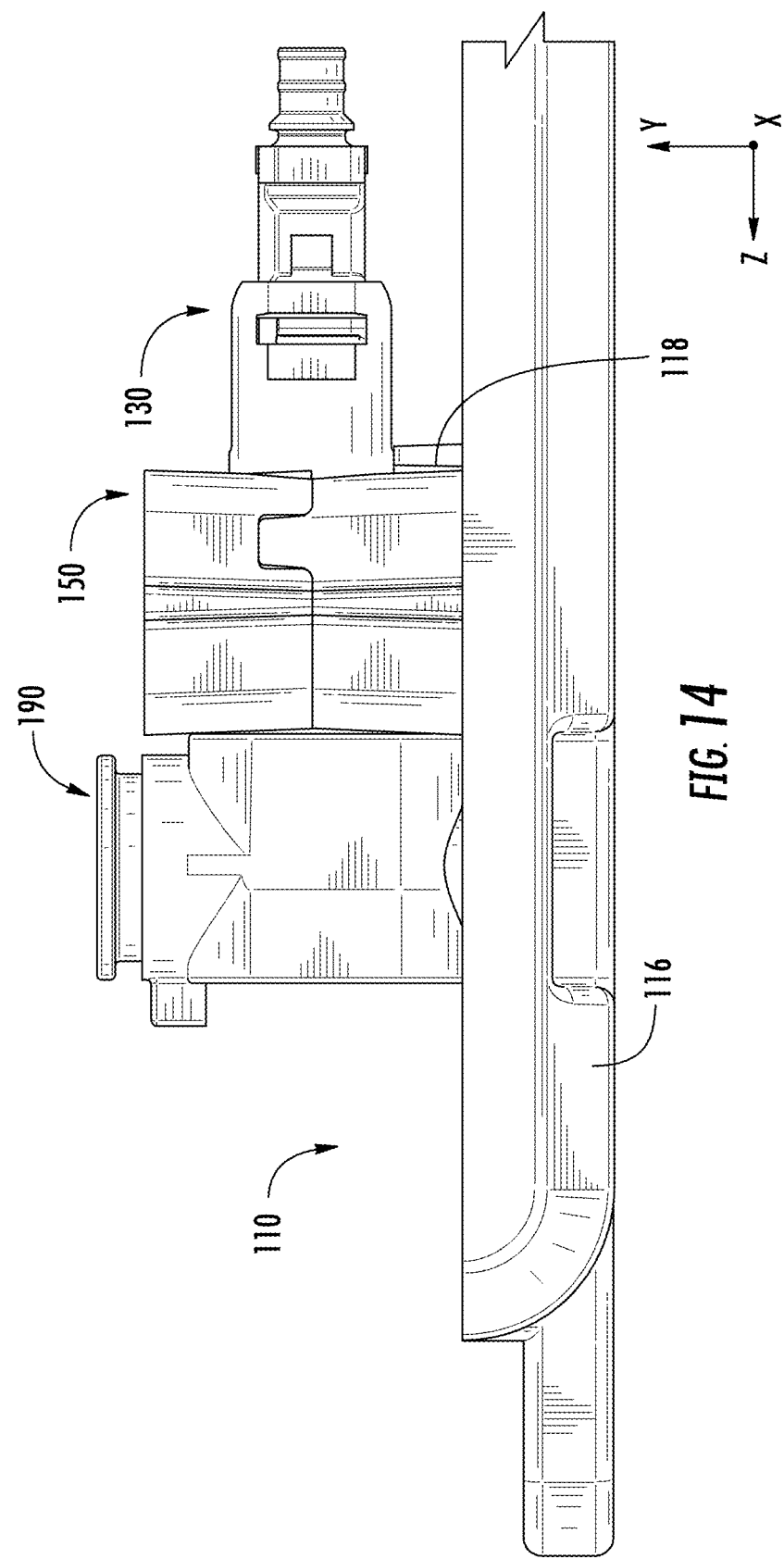
FIG. 14 schematically depicts a side view the push-button securing member, a modular adapter support array, and a plurality of optical adapter assemblies of the multiport assembly of FIG. 1, according to one or more embodiments shown and described herein.

Referring to FIG. 14, a side view of the lower shell member 116, the push-button securing members 190, and optical adapter assemblies 130 is schematically depicted. In embodiments, the modular adapter support array 150 is positioned rearward of the push-button securing members 190 in the longitudinal direction and engages the optical adapter assemblies 130. Each of the optical adapter assemblies 130 may be engaged with and retained within the cavity 112 of the shell 110 by the modular adapter support array 150, as described in greater detail herein.

Figures 15, 16:
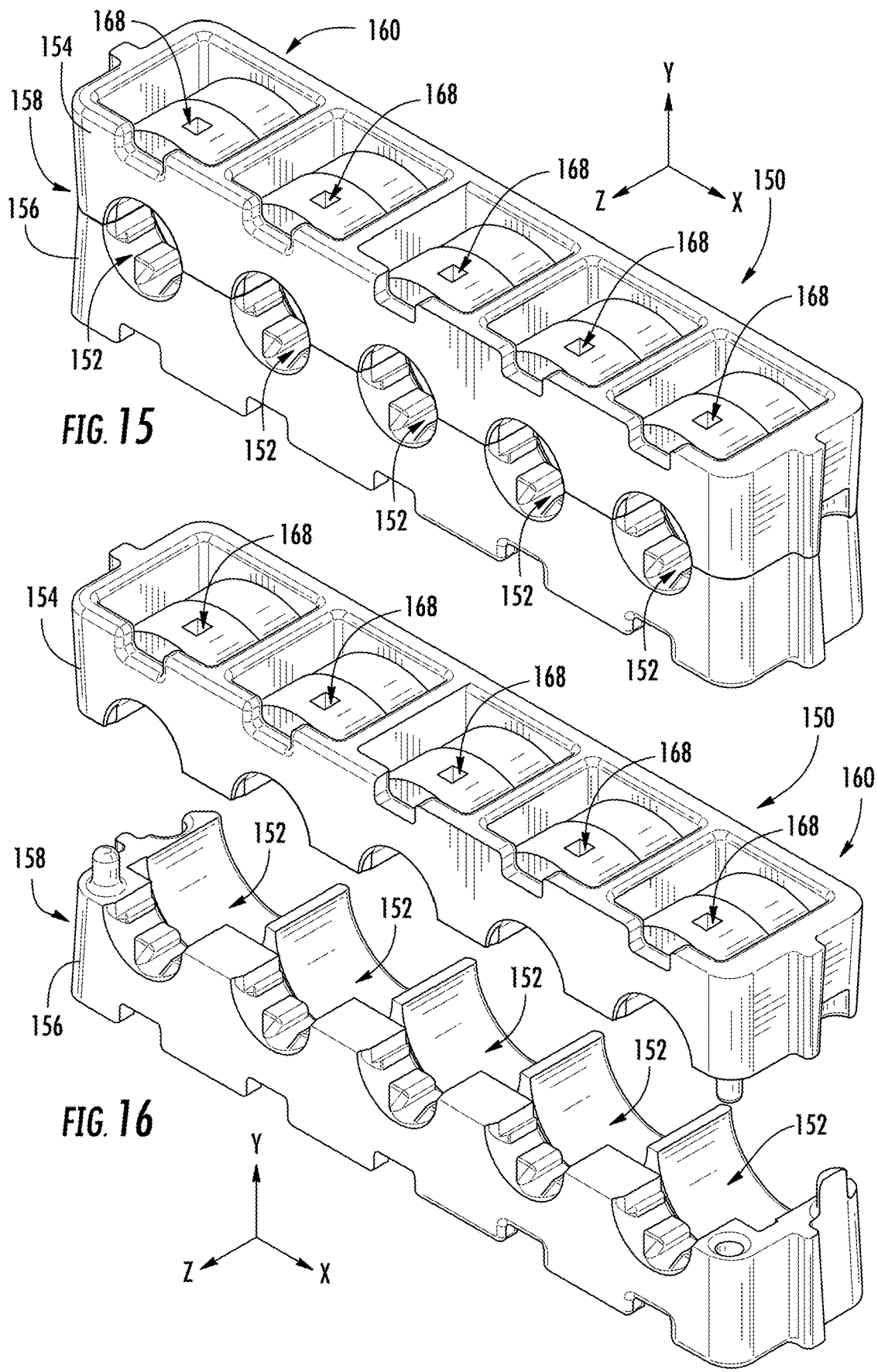
FIG. 15 schematically depicts the modular adapter support array of FIG. 14 in isolation, according to one or more embodiments shown and described herein.
FIG. 16 schematically depicts a front perspective exploded view of the modular adapter support array of FIG. 15, according to one or more embodiments shown and described herein.

Referring to FIGS. 15 and 16, a perspective view and an exploded perspective view of the modular adapter support array 150 are schematically depicted, respectively. The modular adapter support array 150 generally includes an upper support member 154 and a lower support member 156 selectively coupled to the upper support member 154. The upper support member 154 and the lower support member 156 may be selectively coupled to one another in any suitable manner, for example and without limitation, a snap-fit, a mechanical fastener, or the like.

The modular adapter support array 150 generally defines a plurality of adapter passageways 152 extending through the modular adapter support array 150 in the longitudinal direction between an adapter end 160 and a connector end 158 of the modular adapter support array 150. Each of the optical adapter assemblies 130 (FIG. 14) may be positioned at least partially within a corresponding adapter passageway 152 at the adapter end 160 of the modular adapter support array 150, such that the adapter passageway 152 extends around at least a portion of the optical adapter assembly 130. To position the optical adapter assemblies 130 (FIG. 14) within the modular adapter support array 150, the optical adapter assemblies 130 may be first positioned within the lower support member 156 along a corresponding adapter passageway 152 of the modular adapter support array 150. Once all of the optical adapter assemblies 130 (FIG. 14) are positioned within the lower support member 156, the upper support member 154 may be selectively coupled to the lower support member 156 to retain the optical adapter assemblies 130 within the modular adapter support array 150. In some embodiments, the adapter end 160 of the plurality of adapter passageways 152 defines an inner perimeter that is greater than an inner perimeter of the plurality of adapter passageways 152 at the connector end 158. In embodiments, the optical adapter assemblies 130 (FIG. 14) may include an outer perimeter that is generally larger than the inner perimeter of the adapter passageways 152 at the connector end 158. In this way, the comparatively smaller inner perimeter of the adapter passageways 152 at the connector end 158 may restrict forward movement of the optical adapter assemblies 130 (FIG. 14) in the longitudinal direction (i.e., in the +Z-direction as depicted).

In embodiments, the input tether 200 (FIG. 7) and the optical connectors 210 (FIG. 7) may be positioned at least partially within a corresponding adapter passageway 152 at the connector end 158 of the modular adapter support array 150 to optically couple the optical connectors 210 and/or the input tether 200 to a corresponding optical adapter assembly 130 (FIG. 14).

Figure 17:
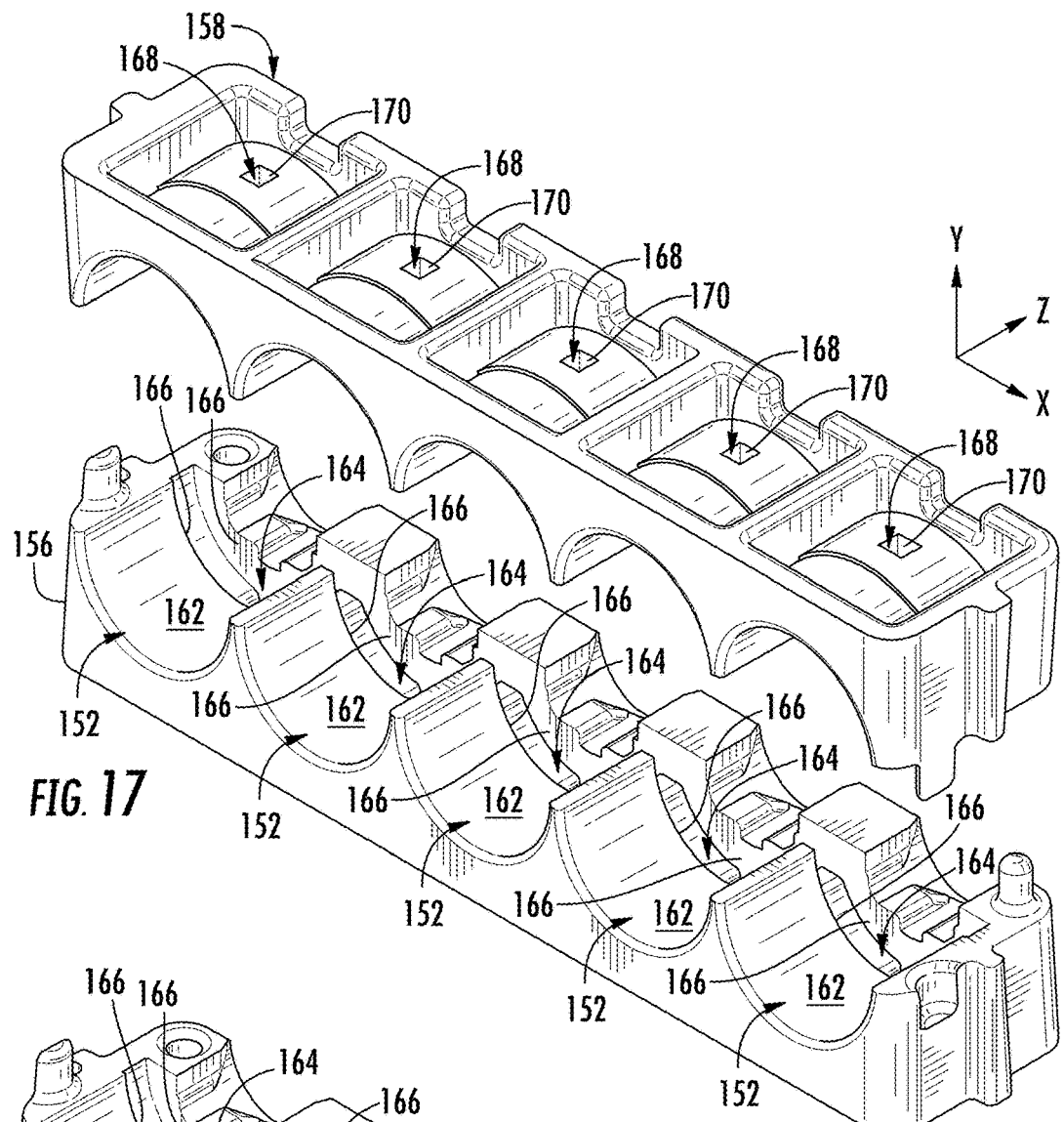
FIG. 17 schematically depicts a rear perspective exploded view of the modular adapter support array of FIG. 15, according to one or more embodiments shown and described herein.

Referring to FIG. 17, a rear perspective exploded view of the modular adapter support array 150 is schematically depicted. In embodiments, the adapter end 160 of each of the plurality of adapter passageways 152 of the modular adapter support array 150 defines a nominal portion 162 and a flange engagement portion 164 interrupting the nominal portion 162. The flange engagement portion 164 defines at least one flange engagement face 166 that engages a flange 136 of a corresponding optical adapter assembly 130 (see, e.g., FIG. 19), as described in greater detail herein. In the embodiment depicted in FIG. 17, each of the flange engagement portions 164 define a pair of opposing flange engagement faces 166 that face one another in the longitudinal direction. The nominal portion 162 of the adapter passageways 152 is referenced herein as being "nominal" to help distinguish it from the flange engagement portion 164 defined on adapter passageways 152. Without the flange engagement portion 164, the nominal portion 162 of each of the adapter passageways 152 would form a relatively uniform and continuous surface, and would extend to the reduced inner perimeter of the connector end 158 of the adapter passageway 152. In the embodiment depicted in FIG. 17, the flange engagement portions 164 extend outward from the nominal portion 162 of the adapter passageways 152, and may be formed as cut-outs extending outward from the nominal portion 162. In other embodiments, the flange engagement portions 164 may be formed as an additive feature extending inward from the nominal portion 162 of the adapter passageways 152.

Figure 18:
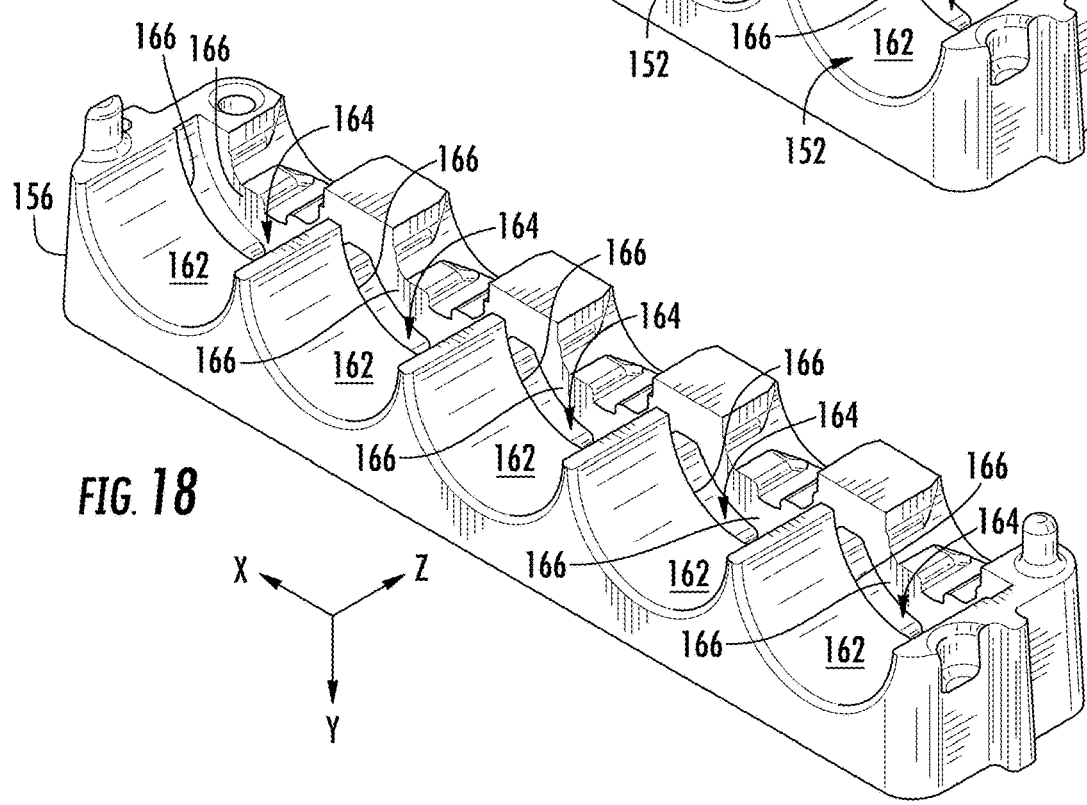
FIG. 18 schematically depicts a rear perspective view of an upper member of the modular adapter support array of FIG. 15, according to one or more embodiments shown and described herein.

While the flange engagement portions 164 are depicted as being defined on the lower support member 156 in the embodiment depicted in FIG. 17, the flange engagement portions 164 may extend around the perimeter of the adapter passageways 152. For example and referring to FIG. 18, a perspective view of the upper support member 154 is schematically depicted, and the flange engagement portions 164 generally extend around the entire perimeter of the corresponding adapter passageways 152. In other embodiments, the flange engagement portions 164 may solely be positioned on a discrete portion of the corresponding adapter passageways 152.

Referring again to FIG. 17, in embodiments, the modular adapter support array 150 defines a plurality of rotationally-discrete adapter engagement portions 168. Each of the plurality of rotationally-discrete adapter engagement portions 168 are positioned on a corresponding adapter passageway 152 and define at least one adapter engagement face 170 that extends in a plane that is aligned with the longitudinal direction. In the embodiment depicted in FIG. 17, the rotationally-discrete adapter engagement portions 168 each include a pair of opposing adapter engagement faces 170. As used herein, the term "rotationally" discrete represents a limited width-wise extent along the perimeter of the adapter passageway 152, as the modular adapter support array 150 is rotated about the adapter passageway 152, and indicates that the rotationally-discrete feature does not extend along the entire perimeter. In embodiments, the at least one adapter engagement face 170 engages a rotationally-discrete engagement support array engagement portion of a corresponding optical adapter assembly 130 (FIG. 14), as described in greater detail herein. In the embodiment depicted in FIG. 17, each of the plurality of rotationally-discrete adapter engagement portions 168 are formed as a cut-out defined in the modular adapter support array 150, however, in other embodiments, the rotationally-discrete adapter engagement portions 168 may be formed as an additive feature, each extending inward toward a corresponding adapter passageway 152. Furthermore, while the plurality of rotationally-discrete adapter engagement portions 168 are depicted on the upper support member 154, it should be understood that in some embodiments the plurality of rotationally-discrete adapter engagement portions 168 may be positioned on the lower support member 156.

Figure 19:
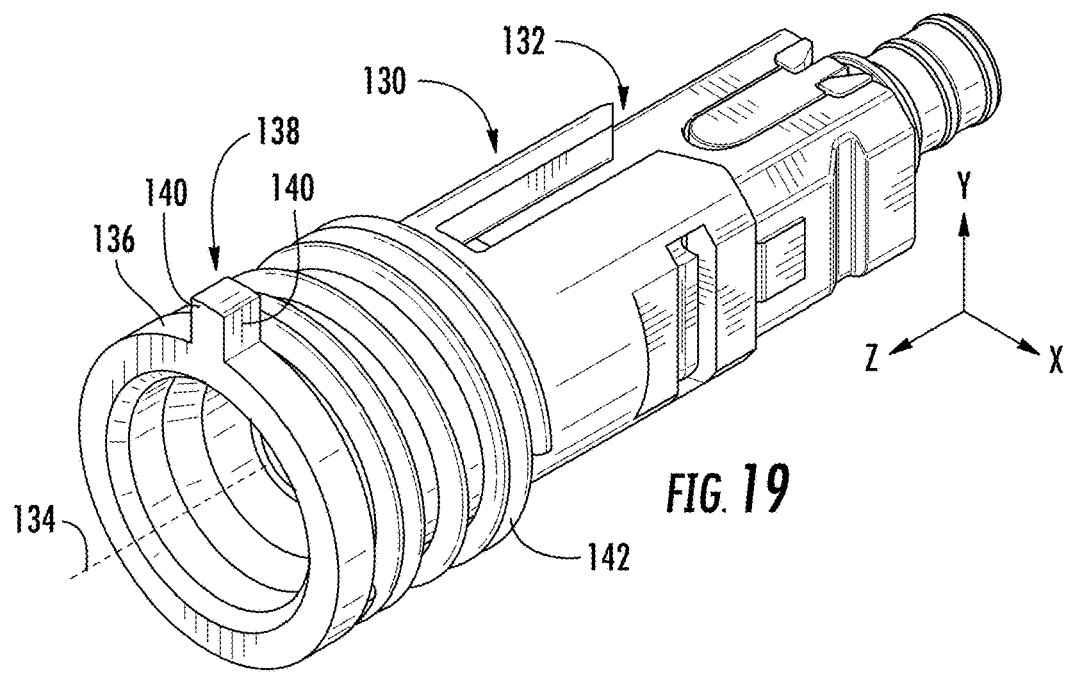
FIG. 19 schematically depicts an optical adapter assembly of FIG. 14 in isolation, according to one or more embodiments shown and described herein.

Referring to FIG. 19, an optical adapter assembly 130 is depicted in isolation. In embodiments, each of the optical adapter assemblies 130 generally include an adapter body 132 and an adapter axis 134 extending along the adapter body 132 in the longitudinal direction. The optical adapter assemblies 130 generally include a flange 136 extending outward from the outward from the adapter body 132 in a direction that transverse to the adapter axis 134. In embodiments, the flange 136 of each of the optical adapter assemblies 130 may engage the flange engagement portion 164 (FIG. 17) of a corresponding adapter passageway 152 (FIG. 17) of the modular adapter support array 150 (FIG. 17), as described in greater detail herein.

In embodiments, each of the optical adapter assemblies 130 include a biasing member 142 (see, e.g., FIG. 19) positioned around the adapter body 132. The biasing member 142 of each of the optical adapter assemblies 130 is engaged with the flange 136 and may act to bias the optical adapter assembly 130 forward in the longitudinal direction when installed to the multiport assembly 100 (FIG. 1).

Each of the optical adapter assemblies 130 further include a rotationally-discrete support array engagement portion 138. The rotationally-discrete support array engagement portion 138 of each of the optical adapter assemblies 130 generally includes a feature that is complementary (e.g., corresponding and the opposite of) the rotationally-discrete adapter engagement portions 168 (FIG. 17) of the modular adapter support array 150 (FIG. 17). In embodiments, the rotationally-discrete support array engagement portion 138 extends outward from the adapter body 132 of the optical adapter assembly 130. In other embodiments, the rotationally-discrete support array engagement portion 138 may extend inward into the adapter body 132. The rotationally-discrete support array engagement portions 138 of each of the optical adapter assemblies 130 generally includes at least one support array engagement face 140 that extends in a plane that is aligned with the adapter axis 134, and in some embodiments, the optical adapter assemblies 130 include a pair of opposing support array engagement faces 140. In the embodiment depicted in FIG. 19, the rotationally-discrete support array engagement portion 138 is positioned on the flange 136, however, it should be understood that the rotationally-discrete support array engagement portion 138 may be positioned at any suitable location along the adapter body 132.

Figure 20:
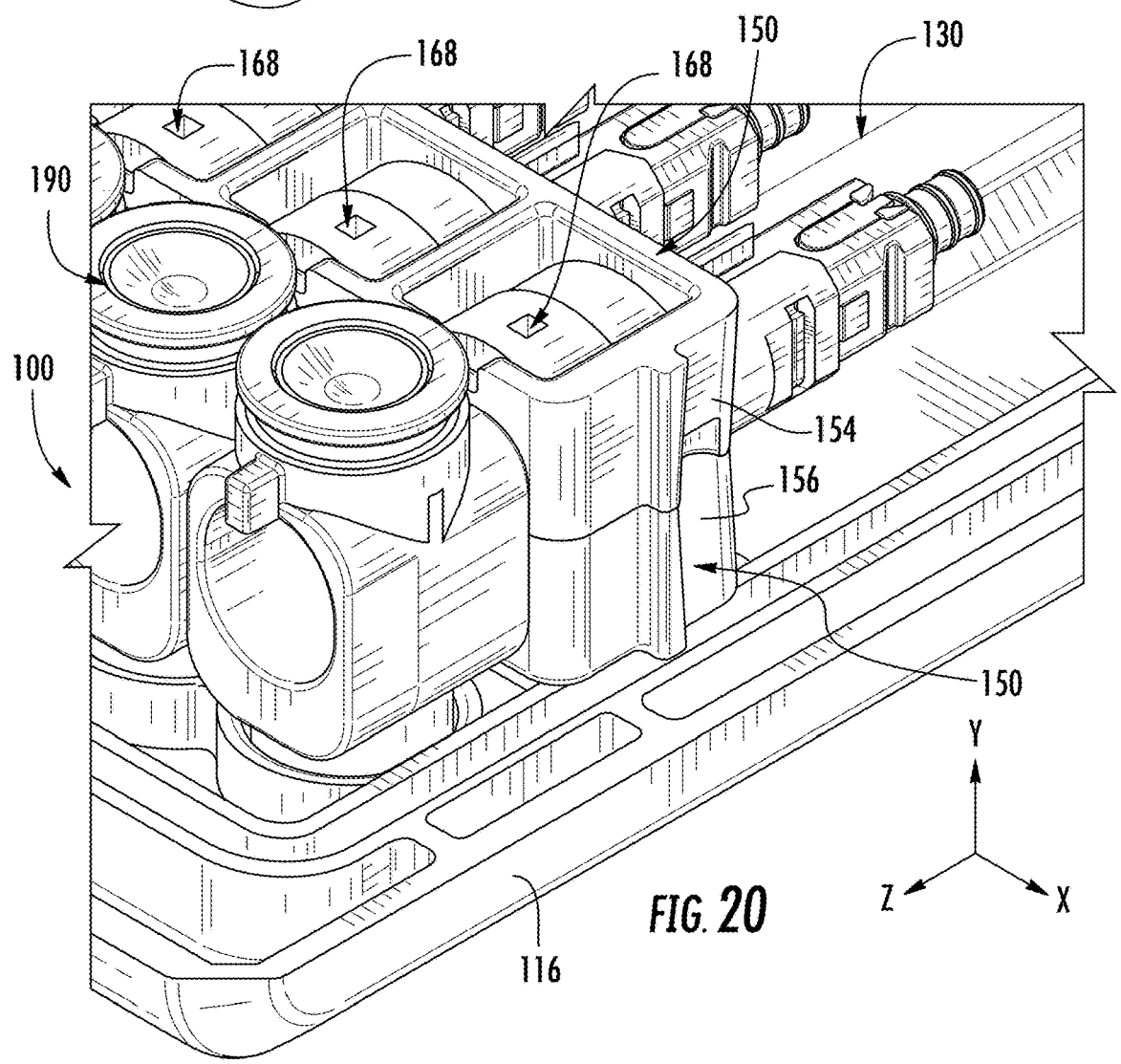
FIG. 20 schematically depicts an enlarged perspective view of the plurality of optical adapter assemblies positioned within the modular adapter support array of FIG. 14, according to one or more embodiments shown and described herein.
Figure 21:
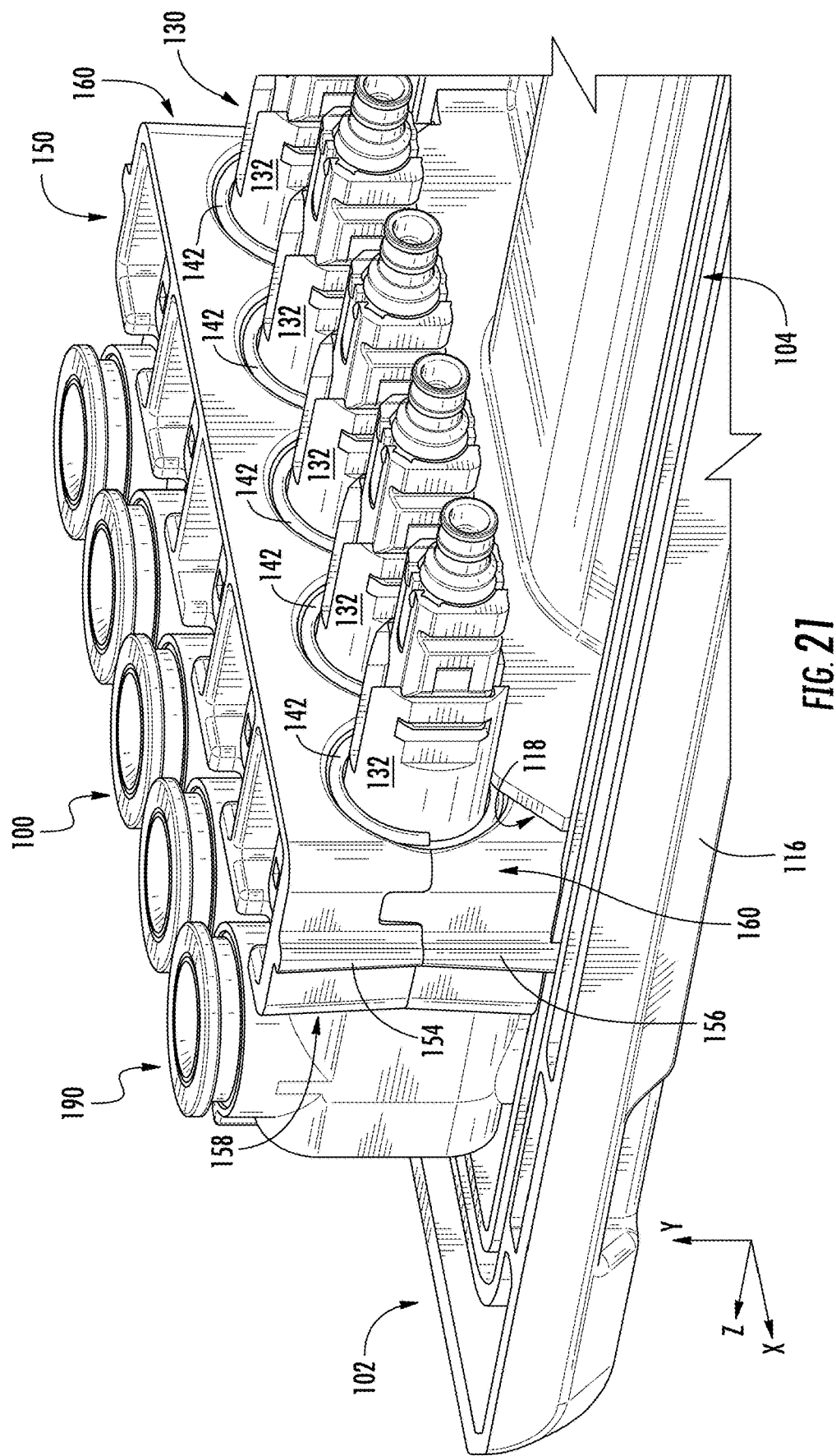
FIG. 21 schematically depicts a rear perspective view of the plurality of optical adapter assemblies positioned within the modular adapter support array of FIG. 14, according to one or more embodiments shown and described herein.

Referring to FIGS. 20 and 21, a front perspective view and a rear perspective view of the optical adapter assemblies 130 installed into the modular adapter support array 150 are schematically depicted, respectively. To assemble the multiport assembly 100, individual optical adapter assemblies 130 may be positioned within corresponding adapter passageways 152 (FIG. 17) of the lower support member 156. With the optical adapter assemblies 130 positioned in the lower support member 156, the upper support member 154 may then be selectively coupled to the lower support member 156, and the plurality of optical adapter assemblies 130 and the modular adapter support array 150 may be positioned on the lower shell member 116.

Figure 22:
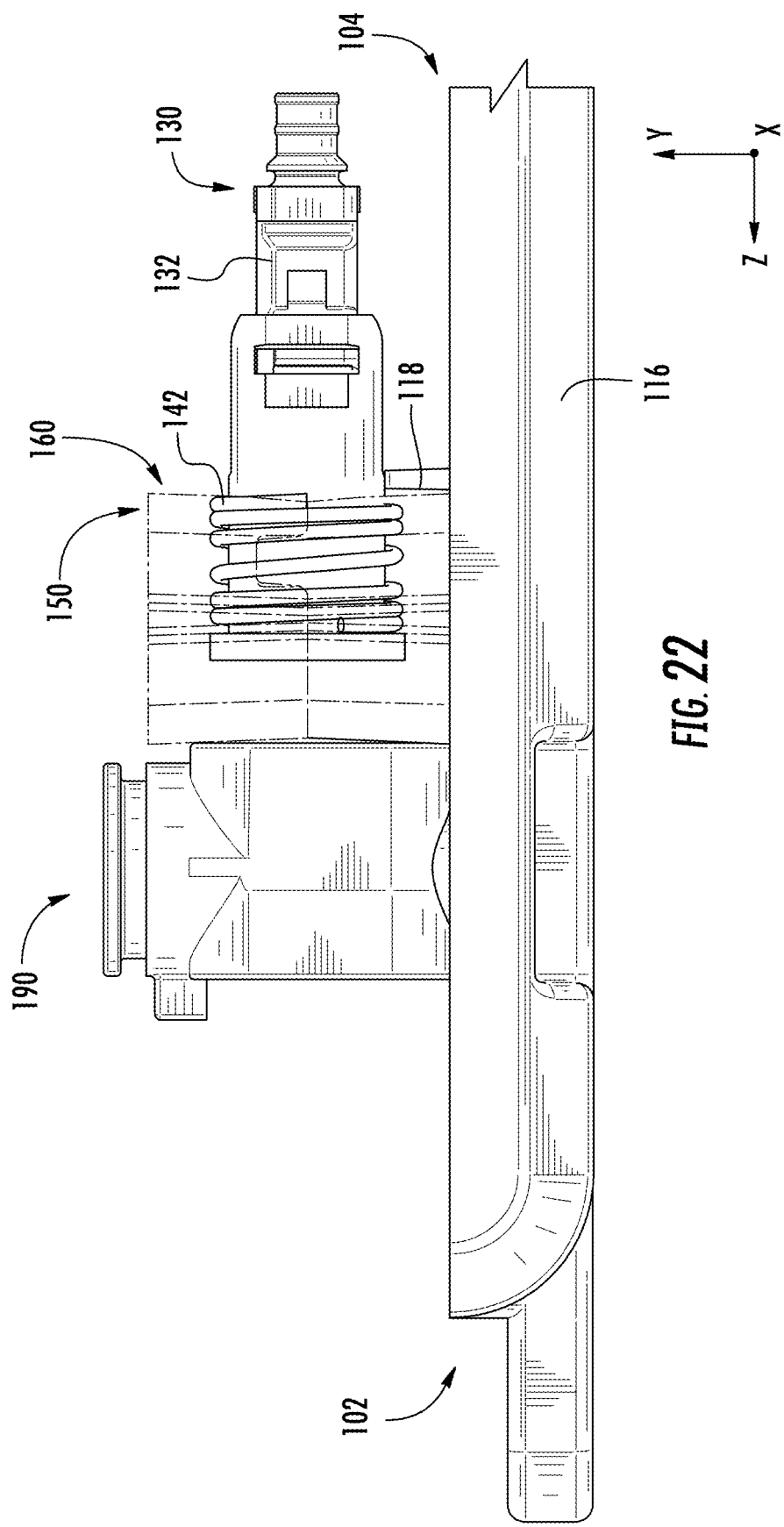
FIG. 22 schematically depicts another side view of the plurality of optical assemblies positioned within the modular adapter support array of FIG. 14, according to one or more embodiments shown and described herein.

Referring to FIGS. 21 and 22, the rear perspective view of the optical adapter assemblies 130 and a side view of the modular adapter support array 150 in hidden lines are schematically depicted, respectively. In embodiments, the biasing member 142 of each of the optical adapter assemblies 130 is positioned within the modular adapter support array 150 and at least a portion of the biasing member 142 of each of the optical adapter assemblies 130 extends outward and rearward from the adapter end 160 of the modular adapter support array 150. In embodiments, each of the biasing members 142 may engage the biasing member engagement surface 118 of the lower shell member 116. As described above, the biasing member engagement surface 118 is oriented to face forward in the longitudinal direction (i.e., in the +Z-direction as depicted), and engagement between the biasing members 142 and the biasing member engagement surface 118 acts to bias the optical adapter assemblies 130 forward in the longitudinal direction toward the front end 102 of the multiport assembly 100.

Figure 23:
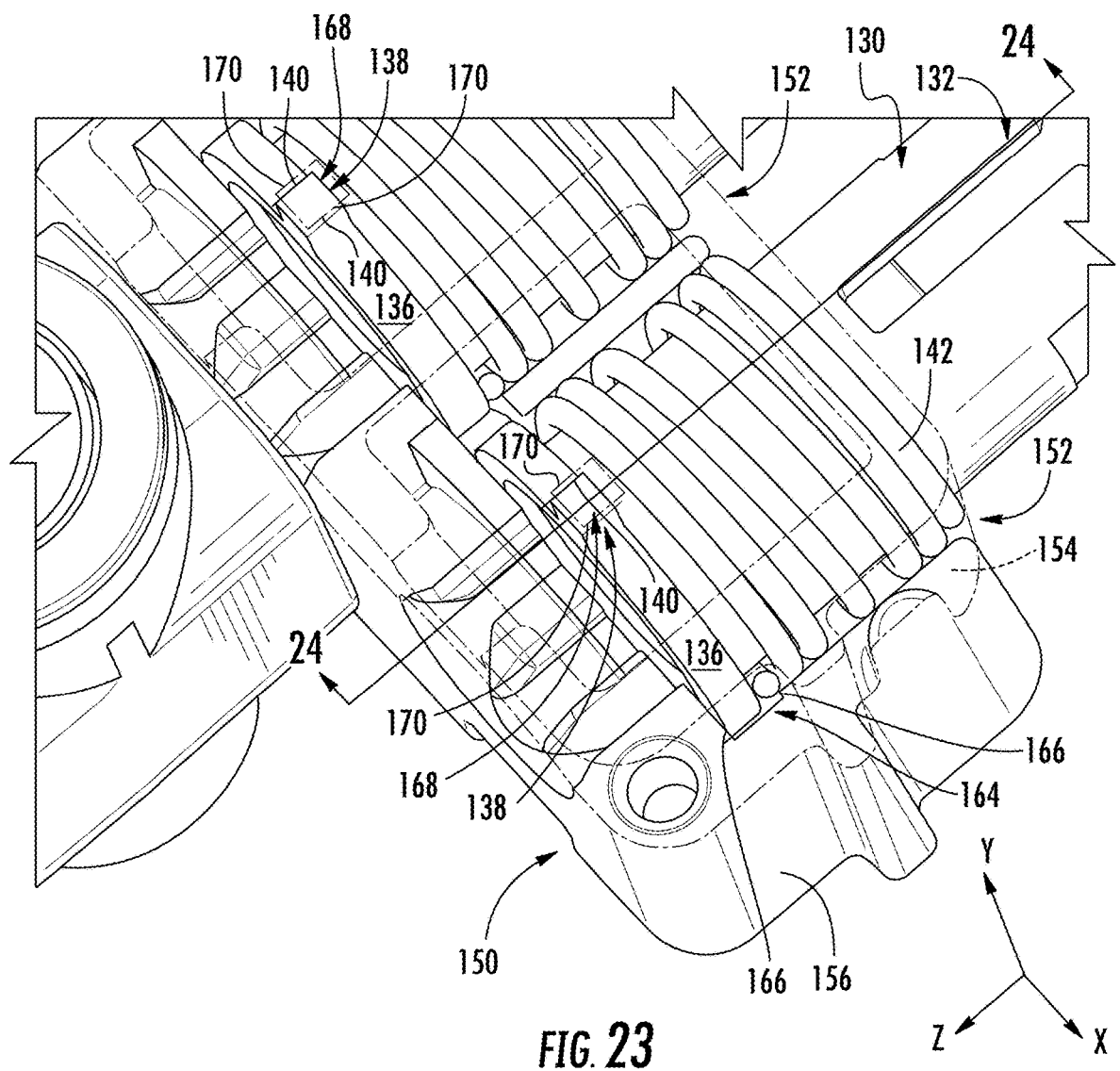
FIG. 23 schematically depicts a top perspective view of the plurality of optical assemblies positioned within the modular adapter support array of FIG. 14, according to one or more embodiments shown and described herein.

Referring to FIGS. 23 and 24, a perspective view of the modular adapter support array 150 with the upper support member 154 shown in hidden lines, and a section view of the support array along section 24-24 of FIG. 23 are schematically depicted, respectively. With each of the optical adapter assemblies 130 positioned within the modular adapter support array 150, the flange 136 of each of the optical adapter assemblies 130 is engaged with the flange engagement portions 164 of each of the corresponding adapter passageways 152. In particular, the at least one flange engagement face 166 of the flange engagement portion 164 of each of the adapter passageways 152 is engaged with a corresponding flange 136 of the optical adapter assemblies 130. In the embodiment depicted in FIGS. 23 and 24, each of the flange engagement portions 164 include the pair of flange engagement faces 166 that oppose each other in the longitudinal direction. By engaging the opposing flange engagement faces 166, the flanges 136 of each of the optical adapter assemblies 130 may be restricted with respect to the modular adapter support array 150 in the longitudinal direction. In some embodiments the opposing flange engagement faces 166 are spaced apart from one another by a distance evaluated in the longitudinal direction (i.e., in the Z-direction as depicted) that is greater than a thickness of the flanges 136, such that the plurality of optical adapter assemblies 130 have some freedom of movement with respect to the modular adapter support array 150 in the longitudinal direction. In other embodiments, the opposing flange engagement faces 166 are spaced apart from one another in the longitudinal direction by a distance that generally corresponds to a thickness of the flanges 136 to restrict movement of the optical adapter assemblies 130 with respect to the modular adapter support array 150 in the longitudinal direction.

As the engagement between the biasing members 142 and the biasing member engagement surface 118 (FIG. 22) bias the optical adapter assemblies 130 forward in the longitudinal direction (i.e., in the +Z-direction as depicted), the modular adapter support array 150 is also biased forward in the longitudinal direction via engagement between the flange engagement faces 166 and the flanges 136 of each of the optical adapter assemblies 130. Furthermore, as each of the flanges 136 of each of the optical adapter assemblies 130 are engaged with the flange engagement faces 166, movement of the optical adapter assemblies 130 with respect to one another in the longitudinal direction may be restricted by the modular adapter support array 150.

The rotationally-discrete support array engagement portion 138 of each of the optical adapter assemblies 130 is engaged with a corresponding rotationally-discrete adapter engagement portion 168 of the modular adapter support array 150. In particular, the at least one support array engagement face 140 of the optical adapter assembly 130 is engaged with a corresponding at least one adapter engagement face 170 of the modular adapter support array 150. In the embodiment depicted in FIGS. 23 and 25 the rotationally-discrete support array engagement portion 138 of each of the optical adapter assemblies 130 include the opposing pair of support array engagement faces 140, and each of the rotationally-discrete adapter engagement portions 168 include the pair of opposing adapter engagement faces 170. Engagement between the pair of support array engagement faces 140 of the optical adapter assemblies 130 and a corresponding pair of opposing adapter engagement faces 170 restricts rotation of each of the optical adapter assemblies 130 with respect to the modular adapter support array 150 about the longitudinal direction. By restricting rotation of the optical adapter assemblies 130 about the longitudinal direction, the modular adapter support array 150 may assist in maintaining alignment of the optical adapter assemblies 130 with corresponding optical connectors 210 (FIG. 7), which may improve the quality of an optical connection between the optical connectors 210 and optical fibers positioned within the optical adapter assemblies 130.

In some embodiments, the rotationally-discrete adapter engagement portions 168 of the modular adapter support array 150 may be larger than the rotationally-discrete support array engagement portions 138 of the optical adapter assemblies 130 in the longitudinal direction (i.e., evaluated in the Z-direction as depicted). In this way, the optical adapter assemblies 130 may have some freedom of movement in the longitudinal direction with respect to the modular adapter support array 150. As noted above, the biasing members 142 may the optical adapter assemblies 130 forward in the longitudinal direction, such that the rotationally-discrete array engagement portions 138 of the optical adapter assemblies 130 are positioned at a forward portion of the rotationally-discrete adapter engagement portions 168 of the modular adapter support array 150. In other embodiments, the rotationally-discrete adapter engagement portions 168 of the modular adapter support array 150 may be sized such that movement of the optical adapter assemblies 130 with respect to the modular adapter support array 150 is restricted via engagement between the rotationally-discrete support array engagement portions 138 of the optical adapter assemblies 130 and the rotationally-discrete adapter engagement portions 168 of the modular adapter support array 150.

Accordingly, it should now be understood that multiport assemblies of the present disclosure generally include a plurality of optical adapter assemblies that are positioned within a modular adapter support array. To assemble the multiport assembly, each of the plurality of optical adapter assemblies may first be installed to the modular adapter support array, and then the modular adapter support array and the optical adapter assemblies may be installed within a cavity of a shell of the multiport assembly. By installing all of the optical adapter assemblies within the cavity of the shell at once, the installation of the optical adapter assemblies to the multiport assembly may be simplified as compared to configurations in which the optical adapter assemblies are individually installed to the multiport assembly.

In embodiments, the modular adapter support array includes rotationally-discrete adapter engagement portions that engage corresponding optical adapter assemblies and restrict rotation of the optical adapter assemblies with respect to the modular adapter support array. By restricting rotation of the optical adapter assemblies, rotational alignment between the optical adapter assemblies and optical connectors that are optically coupled to the optical adapter assemblies may be improved, resulting in reduced signal loss between the optical connectors and the optical adapter assemblies.

It is noted that recitations herein of a component of the present disclosure being "structurally configured" in a particular way, to embody a particular property, or to function in a particular manner, are structural recitations, as opposed to recitations of intended use. More specifically, the references herein to the manner in which a component is "structurally configured" denotes an existing physical condition of the component and, as such, is to be taken as a definite recitation of the structural characteristics of the component.

It is noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining the present invention it is noted that the terms "substantially" and "about" are utilized herein to represent the inherent degree of uncertainty that may be attributed to any quantitative comparison, value, measurement, or other representation. The terms "substantially" and "about" are also utilized herein to represent the degree by which a quantitative representation may vary from a stated reference without resulting in a change in the basic function of the subject matter at issue.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

It is noted that one or more of the following claims utilize the term "wherein" as a transitional phrase. For the purposes of defining the present invention, it is noted that this term is introduced in the claims as an open-ended transitional phrase that is used to introduce a recitation of a series of characteristics of the structure and should be interpreted in like manner as the more commonly used open-ended preamble term "comprising."

The invention claimed is:

1. A multiport assembly comprising:
a shell defining a cavity positioned within the shell, the shell extending between a front end and a rear end positioned opposite the front end in a longitudinal direction;
a plurality of optical adapter assemblies positioned within the cavity of the shell, the plurality of optical adapter assemblies structurally configured to receive, align, and optically couple dissimilar optical connectors;
a modular adapter support array engaged with the plurality of optical adapter assemblies and positioned within the cavity, the modular adapter support array defining a plurality of adapter passageways extending through the modular adapter support array in the longitudinal direction, wherein each adapter passageway of the plurality of adapter passageways extends around at least a portion of a corresponding optical adapter assembly of the plurality of optical adapter assemblies;
a plurality of optical connector ports positioned at the front end of the shell and defining respective connector insertion paths extending inward from the plurality of optical connector ports toward the cavity of the shell, the connector insertion paths configured to enable optical connectors to access the plurality of optical adapter assemblies engaged with the modular adapter support array; and
a plurality of push-button securing members associated with respective ones of the connector insertion paths, each push-button securing member of the plurality of push-button securing members being repositionable between an engaged position, in which at least a portion of the push-button securing member intersects the connector insertion path, and a disengaged position, in which the push-button securing member is spaced apart from the connector insertion path.

2. The multiport assembly of claim 1, wherein the modular adapter support array is removable from the shell in a non-destructive manner.

3. The multiport assembly of claim 1, wherein the modular adapter support array comprises an upper support member and a lower support member selectively coupled to the upper support member, the upper support member and the lower support member defining the plurality of adapter passageways.

4. The multiport assembly of claim 1, wherein each of the plurality of adapter passageways of the modular adapter support array define a connector end and an adapter end positioned opposite the connector end in the longitudinal direction, each of the plurality of adapter passageways extending between the connector end and the adapter end, wherein the adapter end defines an inner perimeter of each of the plurality of adapter passageways that is greater than an inner perimeter of each of the plurality of adapter passageways at the connector end.

5. The multiport assembly of claim 4, wherein:
each of the plurality of optical adapter assemblies comprise an adapter body defining an adapter axis and a flange extending outward from the adapter body in a direction that is transverse to the adapter axis; and
the adapter end of each of the plurality of adapter passageways of the modular adapter support array defines a nominal portion and a flange engagement portion interrupting the nominal portion, the flange engagement portion defining a flange engagement face configured to engage with the flange of a corresponding optical adapter assembly.

6. The multiport assembly of claim 5, wherein each of the flange engagement portions extend outward from a corresponding adapter passageway.

7. The multiport assembly of claim 1, wherein each of the plurality of optical adapter assemblies comprise an adapter body and a biasing member engaged with the adapter body.

8. The multiport assembly of claim 7, wherein the adapter body of each of the plurality of optical adapter assemblies defines an adapter axis extending along the adapter body, and a flange extending outward from the adapter body in a direction that transverse to the adapter axis, and wherein the biasing member is configured to engage the flange of each optical adapter assembly.

9. The multiport assembly of claim 8, wherein the shell comprises a biasing member engagement surface positioned within the cavity of the shell, and wherein the biasing members of the plurality of optical adapter assemblies engage the biasing member engagement surface, biasing the plurality of optical adapter assemblies and the modular adapter support array toward the front end of the shell.

10. The multiport assembly of claim 1, wherein each of the plurality of optical adapter assemblies comprise:
an adapter body defining an adapter axis extending along the adapter body; and
a rotationally-discrete support array engagement portion positioned on the adapter body, the rotationally-discrete support array engagement portion defining a support array engagement face that extends in a plane that is aligned with the adapter axis.

11. The multiport assembly of claim 10, wherein the rotationally-discrete support array engagement portion of each of the plurality of optical adapter assemblies extends outward from the respective adapter body.

12. The multiport assembly of claim 11, wherein the modular adapter support array defines a plurality of rotationally-discrete adapter engagement portions, wherein each of the plurality of rotationally-discrete adapter engagement portions are positioned on a corresponding adapter passageway and define an adapter engagement face that extends in a plane that is aligned with the longitudinal direction.

13. The multiport assembly of claim 12, wherein the plurality of rotationally-discrete adapter engagement portions comprise a plurality of cut-outs extending outward from an Inner perimeter of each of the plurality of adapter passageways.

14. The multiport assembly of claim 1, further comprising an input tether comprising a plurality of optical fibers connected with corresponding optical adapter assemblies of the plurality of optical adapter assemblies.

15. The multiport assembly of claim 14, wherein the shell further defines an input connector port positioned at the front end of the shell, wherein at least a portion of the input tether is positioned within the input connector port.

16. The multiport assembly of claim 1, wherein the shell comprises an outward-facing surface and a slotted mounting member selectively coupled to the outward-facing surface, the slotted mounting member defining a slot to selectively couple the multiport assembly to an object.

17. The multiport assembly of claim 1, further comprising a plurality of grommets extending around the plurality of push-button securing members, the plurality of grommets extending between the plurality of push-button securing members and the shell, wherein the grommets seal the cavity of the shell as the plurality of push-button securing members move between the engaged position and the disengaged position.

18. The multiport assembly of claim 17, wherein the plurality of grommets extend inward toward the cavity of the shell by a grommet height that corresponds to a travel distance between the engaged position and the disengaged position of the plurality of push-button securing members.

19. The multiport assembly of claim 17, further comprising a plurality of securing member biasing members positioned within the cavity of the shell and engaging the plurality of push-button securing members and biasing the plurality of push-button securing members into the engaged position.

20. The multiport assembly of claim 1, further comprising a splitter positioned within the cavity of the shell and a plurality of optical fibers extending between the splitter and the plurality of optical adapter assemblies.

21. A method for assembling a multiport assembly, the method comprising:
    engaging a plurality of optical adapter assemblies with a modular adapter support array, wherein each of the optical adapter assemblies are positioned within corresponding adapter passageways of the modular adapter support array;
    positioning the plurality of optical adapter assemblies and the modular adapter support array within a cavity of a shell;
    aligning the plurality of optical adapter assemblies with a plurality of optical connector ports positioned at a front end of the shell and defining respective connector insertion paths extending inward from the plurality of optical connector ports to the cavity of the shell and permitting optical connectors to access the plurality of optical adapter assemblies engaged with the modular adapter support array; and
    positioning a plurality of push-button securing members associated with respective ones of the connector insertion paths in the shell, each push-button securing member of the plurality of push-button securing members being repositionable between an engaged position, in which at least a portion of the push-button securing member intersects the connector insertion path, and a disengaged position, in which the push-button securing member is spaced apart from the connector insertion path.

22. The method of claim 21, wherein engaging the plurality of optical adapter assemblies with the modular adapter support array comprises positioning the optical adapter assemblies within a lower support member of the modular adapter support array and selectively coupling an upper support member of the modular adapter support array to the lower support member.

23. The method of claim 21, further comprising engaging a flange of each of the optical adapter assemblies with a flange engagement portion of each of the adapter passageways of the modular adapter support array.

24. The method of claim 21, further comprising biasing the modular adapter support array toward the front end of the shell.

25. The method of claim 24, wherein biasing the modular adapter support array toward the front end of the shell comprises engaging a plurality of biasing members with the optical adapter assemblies and a biasing member engagement surface positioned within the cavity of the shell, wherein the biasing member engagement surface is oriented to face forward in a longitudinal direction.

26. The method of claim 21, further comprising coupling a plurality of optical fibers to the plurality of optical adapter assemblies.

27. The method of claim 26, wherein coupling the plurality of optical fibers to the plurality of optical adapter assemblies comprises inserting an input tether into an input connector port positioned at the front end of the shell.

28. The method of claim 21, further comprising engaging a rotationally-discrete support array engagement portion of each of the plurality of optical adapter assemblies with a corresponding rotationally-discrete adapter engagement portion of the modular adapter support array to restrict rotation of the plurality of optical adapter assemblies with respect to the modular adapter support array about a longitudinal direction that extends along the adapter passageways of the modular adapter support array.

29. The method of claim 21, further comprising selectively coupling a slotted mounting member to an outward-facing surface of the shell, the slotted mounting member and the outward-facing surface defining a slot.

* * * * *

UNITED STATES PATENT AND TRADEMARK OFFICE
CERTIFICATE OF CORRECTION

PATENT NO. : 10,641,967 B1
APPLICATION NO. : 16/193278
DATED : May 5, 2020
INVENTOR(S) : Monique Lise Cote et al.

Page 1 of 1

It is certified that error appears in the above-identified patent and that said Letters Patent is hereby corrected as shown below:

In the Claims

In Column 18, Line 58, Claim 13, delete "Inner" and insert -- inner --, therefor.

Signed and Sealed this
Twenty-eighth Day of July, 2020

Andrei Iancu
*Director of the United States Patent and Trademark Office*